United States Patent
Nakamura

(10) Patent No.: US 9,400,771 B2
(45) Date of Patent: *Jul. 26, 2016

(54) SUPPORTING GENERATION OF TRANSFORMATION RULE

(75) Inventor: Taiga Nakamura, Kanagawa (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1004 days.

This patent is subject to a terminal disclaimer.

(21) Appl. No.: 13/551,800

(22) Filed: Jul. 18, 2012

(65) Prior Publication Data

US 2013/0185627 A1    Jul. 18, 2013

Related U.S. Application Data

(63) Continuation of application No. 13/545,137, filed on Jul. 10, 2012.

(30) Foreign Application Priority Data

Jul. 22, 2011   (JP) .................. 2011-161047

(51) Int. Cl.
G06F 17/00   (2006.01)
G06F 17/22   (2006.01)

(52) U.S. Cl.
CPC .......... *G06F 17/227* (2013.01); *G06F 17/2247* (2013.01); *G06F 17/2264* (2013.01)

(58) Field of Classification Search
CPC  G06F 17/2247; G06F 17/2264; G06F 17/227
See application file for complete search history.

(56) References Cited

U.S. PATENT DOCUMENTS 6,009,436 A * 12/1999 Motoyama et al.
6,085,196 A *  7/2000 Motoyama et al.
(Continued)

FOREIGN PATENT DOCUMENTS

JP    2001344230 A   12/2001
JP    2002007384 A    1/2002
(Continued)

OTHER PUBLICATIONS

Hardy et al, "Mapping and Displaying Structural Transformations between XML and PDF", University of Nottingham, Nov. 8-9, 2002; p. 95-102.*

(Continued)

*Primary Examiner* — William Bashore
*Assistant Examiner* — David Faber
(74) *Attorney, Agent, or Firm* — Cantor Colburn LLP

(57) ABSTRACT

A transformation rule generation supporting apparatus is configured to support generation of a transformation rule for transforming a transformation-source structured document having a hierarchical structure based on physical disposition of data in the document into a transformation-target structured document having a hierarchical structure based on a logical structure of data content. The apparatus includes a user interface configured to generate, display, and edit graphical representation of the transformation rule; and a restoration unit configured to determine a transformation rule in text form from the graphical representation, wherein, for the one-to-many transformation rule, the restoration unit restores the reduced rule by determining, according to an output sort order, the output order in which each of the output elements represented by the plurality of nodes is output for the input element represented by the one node.

12 Claims, 21 Drawing Sheets

(56) References Cited

U.S. PATENT DOCUMENTS

| | | | |
|---|---|---|---|
| 6,279,015 B1* | 8/2001 | Fong et al. | 715/239 |
| 6,487,566 B1* | 11/2002 | Sundaresan | 715/235 |
| 6,626,957 B1* | 9/2003 | Lippert et al. | 715/234 |
| 6,792,595 B1* | 9/2004 | Storistenau et al. | 717/110 |
| 6,823,495 B1* | 11/2004 | Vedula et al. | 715/805 |
| 6,874,141 B1* | 3/2005 | Swamy et al. | 717/144 |
| 7,073,120 B2 | 7/2006 | Torii et al. | |
| 7,159,185 B1* | 1/2007 | Vedula et al. | 715/763 |
| 7,225,411 B1* | 5/2007 | Stoner et al. | 715/760 |
| 7,284,196 B2* | 10/2007 | Skeen et al. | 715/234 |
| 7,308,646 B1* | 12/2007 | Cohen et al. | 715/236 |
| 7,401,255 B1* | 7/2008 | Stringham | 714/13 |
| 7,478,079 B2* | 1/2009 | Robertson et al. | |
| 7,586,926 B2* | 9/2009 | Fritsch et al. | 370/401 |
| 7,827,205 B2* | 11/2010 | Okunseinde et al. | 707/802 |
| 7,873,899 B2* | 1/2011 | Singh | 715/234 |
| 8,032,828 B2* | 10/2011 | Su et al. | 715/235 |
| 8,046,383 B2* | 10/2011 | Weber et al. | 707/802 |
| 8,230,390 B2* | 7/2012 | Koster | 717/109 |
| 8,280,923 B2* | 10/2012 | Robertson et al. | 707/805 |
| 8,286,075 B2* | 10/2012 | Puthiyaveettil | 715/236 |
| 8,489,474 B2* | 7/2013 | Crook et al. | 705/35 |
| 8,626,799 B2* | 1/2014 | Bahl et al. | 707/802 |
| 8,650,320 B1* | 2/2014 | Merrick et al. | 709/230 |
| 8,788,931 B1* | 7/2014 | Chen et al. | 715/234 |
| 2002/0026461 A1* | 2/2002 | Kutay et al. | 707/523 |
| 2002/0059566 A1* | 5/2002 | Delcambre et al. | 717/144 |
| 2002/0129059 A1* | 9/2002 | Eck | 707/513 |
| 2002/0184213 A1* | 12/2002 | Lau et al. | 707/6 |
| 2003/0084078 A1* | 5/2003 | Torii et al. | 707/513 |
| 2003/0120665 A1* | 6/2003 | Fox et al. | 707/100 |
| 2003/0212698 A1* | 11/2003 | Mani et al. | 707/102 |
| 2003/0237046 A1* | 12/2003 | Parker et al. | 715/513 |
| 2004/0015783 A1* | 1/2004 | Lennon et al. | 715/523 |
| 2004/0025117 A1* | 2/2004 | Ingersoll et al. | 715/523 |
| 2004/0060003 A1* | 3/2004 | Mani et al. | 715/513 |
| 2004/0093344 A1* | 5/2004 | Berger et al. | 707/102 |
| 2004/0098311 A1* | 5/2004 | Nair et al. | 705/26 |
| 2004/0205562 A1* | 10/2004 | Rozek et al. | 715/513 |
| 2004/0205571 A1* | 10/2004 | Adler et al. | 715/513 |
| 2004/0205605 A1* | 10/2004 | Adler et al. | 715/517 |
| 2004/0216030 A1* | 10/2004 | Hellman et al. | 715/500 |
| 2004/0268249 A1* | 12/2004 | Fennelly et al. | 715/523 |
| 2005/0060317 A1* | 3/2005 | Lott et al. | 707/10 |
| 2005/0060647 A1* | 3/2005 | Doan et al. | 715/514 |
| 2005/0132282 A1* | 6/2005 | Panditharadhya et al. | 715/516 |
| 2005/0163216 A1* | 7/2005 | Boon et al. | 375/240.12 |
| 2005/0177788 A1* | 8/2005 | Snyder | 715/523 |
| 2005/0257193 A1* | 11/2005 | Falk et al. | 717/109 |
| 2006/0004854 A1* | 1/2006 | Okunseinde et al. | 707/103 Y |
| 2006/0026505 A1* | 2/2006 | Mani et al. | 715/513 |
| 2006/0129926 A1* | 6/2006 | Malek et al. | 715/530 |
| 2006/0130011 A1* | 6/2006 | Cornell et al. | 717/136 |
| 2006/0242563 A1* | 10/2006 | Liu et al. | 715/513 |
| 2006/0259456 A1* | 11/2006 | Falk et al. | 707/2 |
| 2007/0038651 A1* | 2/2007 | Bernstein et al. | 707/100 |
| 2007/0168857 A1* | 7/2007 | Roy | 715/522 |
| 2007/0203923 A1* | 8/2007 | Thomas | 707/100 |
| 2007/0214411 A1* | 9/2007 | Puthiyaveettil | 715/523 |
| 2008/0034010 A1* | 2/2008 | Quan et al. | 707/201 |
| 2008/0082962 A1* | 4/2008 | Falk et al. | 717/113 |
| 2008/0126402 A1* | 5/2008 | Sikchi et al. | 707/102 |
| 2008/0155500 A1* | 6/2008 | Richmond | 717/109 |
| 2008/0178077 A1* | 7/2008 | Boucher | 715/266 |
| 2008/0235199 A1* | 9/2008 | Li et al. | 707/4 |
| 2008/0235260 A1* | 9/2008 | Han et al. | 707/102 |
| 2009/0044103 A1* | 2/2009 | Chalecki et al. | 715/234 |
| 2009/0106282 A1* | 4/2009 | Silverman | 707/101 |
| 2009/0112882 A1* | 4/2009 | Maresh et al. | 707/10 |
| 2009/0112916 A1* | 4/2009 | Stuhec | 707/102 |
| 2009/0125512 A1* | 5/2009 | Robertson et al. | 707/5 |
| 2009/0171720 A1* | 7/2009 | Crook et al. | 705/7 |
| 2009/0187601 A1* | 7/2009 | Sengupta | 707/200 |
| 2009/0265339 A1* | 10/2009 | Chen et al. | 707/5 |
| 2010/0057673 A1* | 3/2010 | Savov | 707/2 |
| 2010/0115046 A1* | 5/2010 | Reddy Byreddy et al. | 709/208 |
| 2011/0066602 A1* | 3/2011 | Studer et al. | 707/690 |
| 2011/0138362 A1* | 6/2011 | Keidar-Barner et al. | 717/126 |
| 2012/0137211 A1* | 5/2012 | Lewontin | 715/236 |
| 2012/0137304 A1* | 5/2012 | Boullery et al. | 719/313 |
| 2012/0143634 A1* | 6/2012 | Beyda et al. | 705/4 |
| 2013/0036349 A1* | 2/2013 | Hui et al. | 715/234 |
| 2013/0036352 A1* | 2/2013 | Hui et al. | 715/234 |
| 2014/0013195 A1* | 1/2014 | Frederiksen | 715/205 |

FOREIGN PATENT DOCUMENTS

| | | |
|---|---|---|
| JP | 2002342316 A | 11/2002 |
| JP | 2006079277 A | 3/2006 |
| JP | 2006139441 A | 6/2006 |
| JP | 2006302085 A | 11/2006 |

OTHER PUBLICATIONS

Srivastava et al, "XSLT Mapping in SAP PI 7.1", Infosys Technologies Limited, Aug. 13, 2010, 21 pages.*

Oracle, "35 Creating Transformations with the XSLT Mapper", Oracle, copyrighted 2009, 42 pages.*

Webmethods, "webMethods EdI Module User Guide Version 6.5", webmethods, Inc; copyrighted 2005, 416 pages.*

IBM, "WebSphere Data Interchange for MultiPlatforms Version 3.3 User Guide", IBM, Mar. 2007, 308 pages.*

IBM, "WebSphere Data Interchange for MultiPlatforms Version 3.3 Programmer's Reference Guide", IBM, Mar. 2007, 596 pages.*

IBM, "WebSphere Data Interchange for MultiPlatforms Version 3.3 Mapping Guide", IBM, Mar. 2007, 386 pages.*

Bea, "BEA AquaLogic Service Bus™ Transforming Data Using the XQuery Mapper Version 2.1", bea, Dec. 2005.*

GXS, "Application Integrator™ Workbench User's Guide Version 5.0", GXS, Dec. 2007, 540 pages.*

Altova, "Altova StyleVision 2011 User & Reference Manual", Altova, Jul. 8, 2011, 1289 pages.*

Leal, "An Engine for Generating XSLT from Examples", University of Porto, Portugal, Jun. 2011, p. 91-101.*

Progress, "Stylus Studio 2011 User Guide", Progress Software, Oct. 2010, 1251 pages.*

Oracle, "Working with One-to-Many Mappings", Oracle, copyrighted 2005, 3 pages.*

Eclipselink, "One-to-Mapping", Eclipse, May 5, 2011, 5 pages.*

Wolcott, Peter, "Getting Started with ERwin", University of Nebraska at Omaha, Apr. 20, 2010, 19 pages.*

Xsl:easy, [online]; [retrieved on May 16, 2012]; retrieved from the Internet http://xsl-easy.com/4.0/xsl: easy, "xsl: easy 4.0—Create Mappings Graphically,", Visual XSLT editor; SoftProject GmbH, 2010, one page.

Eclipse, [online]; [retrieved on Jul. 9, 2012]; retrieved from the Internet http://www.eclipse.org/gmt/umlxEclipse, "UMLX Home Page,"; Eclipse Foundation, 2012, pp. 1-2.

OMG.org, [online]; [retrieved on Jul. 9, 2012]; retrieved from the Internet http://www.omg.org/cgi-bin/doc?ptc/2007-07-07-PDFOMG.org, "Meta Object Facility (MOF) 2.0 Query/View/Transformation Specification," Final Adopted Specification, pct/07-07-07, Belaunde, O.M.G. We Set the Standard, Jul. 2007, pp. 1-232.

W3C, [online]; [retrieved on Jul. 9, 2012]; retrieved from the Internet http://www.w3.org/TR/xslt20/W3C, "XSL Transformations (XSLT) Version 2.0," W3C Recommendation, Jan. 23, 2007, pp. 1-171.

F. Iwama et al.; "A Type System for Static Checking of Design Documents;" Software Engineering Basics XVI, Kindaikagaku sha Co., Ltd.; Nov. 30, 2009; pp. 251-258 (Abstract Only).

* cited by examiner

| No. | screen ID | screen name | subsystem name | remarks |
|---|---|---|---|---|
| 1 | SC310010 | corporation basic information screen | corporation order information management | |
| 2 | SC310020 | corporation statement information screen (input) | corporation order information management | |
| 3 | SC310030 | corporation information search screen | corporation order information management | |
| 4 | SC310040 | corporation search result list screen | corporation order information management | |
| 5 | SC310050 | corporation statement information screen (query) | corporation order information management | |
| 6 | SC310060 | corporation approval screen | corporation order information management | |
| 7 | SC310070 | corporation statement information screen (approval) | corporation order information management | |
| 8 | SC310080 | corporation form output screen | corporation order information management | |
| 9 | SC310090 | corporation customer registration screen | corporation order information management | |
| 10 | SC320010 | individual basic information screen | individual order information management | |
| 11 | SC320020 | individual statement information screen (input) | individual order information management | |
| 12 | SC310030 | individual information search screen | individual order information management | |
| 13 | SC310040 | individual search result list screen | individual order information management | |
| 14 | SC310050 | individual statement information screen (query) | individual order information management | |
| 15 | SC310060 | individual approval screen | individual order information management | | screen list / update history

```
<sheet name= "screen list" >
<row y="2">
<cell x="1" y="2" >No.</cell>
<cell x="2" y="2" >screen ID </cell>
<cell x="3" y="2" >screen name </cell>
<cell x="4" y="2" >subsystem name </cell>
<cell x="5" y="2" >remarks </cell>
</row>
<row y="4">
<cell x="1" y="4" >1</cell>
<cell x="2" y="4" >SC310010</cell>
<cell x="3" y="4" >corporation basic information screen </cell>
<cell x="4" y="4" >corporation order information management </cell>
</row>
<row y="5">
<cell x="1" y="5" >2</cell>
<cell x="2" y="5" >SC310020</cell>
<cell x="3" y="5" >corporation statement information screen (input) </cell>
<cell x="4" y="5" >corporation order information management </cell>
</row>
<row y="6">
<cell x="1" y="6" >3</cell>
<cell x="2" y="6" >SC310030</cell>
<cell x="3" y="6" >corporation information search screen </cell>
<cell x="4" y="6" >corporation order information management </cell>
</row>
<row y="7">
<cell x="1" y="7" >4</cell>
<cell x="2" y="7" >SC310040</cell>
<cell x="3" y="7" >corporation search result list screen </cell>
<cell x="4" y="7" >corporation order information management </cell>
</row>
<row y="8">
<cell x="1" y="8" >5</cell>
<cell x="2" y="8" >SC31005</cell>
<cell x="3" y="8" >corporation statement information screen (query) </cell>
<cell x="4" y="8" >corporation order information management </cell>
</row>
<row y="9">
<cell x="1" y="9" >6</cell>
<cell x="2" y="9" >SC310060</cell>
<cell x="3" y="9" >corporation approval screen </cell>
<cell x="4" y="9" >corporation order information management </cell>
</row>
<row y="10">
<cell x="1" y="10" >7</cell>
<cell x="2" y="10" >SC310070</cell>
<cell x="3" y="10" > corporation statement information screen (approval) </cell>
<cell x="4" y="10" > corporation order information management </cell>
</row>
<row y="11">
<cell x="1" y="11" >8</cell>
<cell x="2" y="11" >SC310080</cell>
<cell x="3" y="11" > corporation form output screen </cell>
<cell x="4" y="11" > corporation order information management </cell>
</row>
<row y="12">
<cell x="1" y="12" >9</cell>
<cell x="2" y="12" >SC310090</cell>
<cell x="3" y="12" > corporation customer registration screen </cell>
<cell x="4" y="12" > corporation order information management </cell>
...
</sheet>
...
```

Figure 6

```
...
<list label="3." type="ordered"> Subsystem Screen Definitions </list>
<list label="3.1" type="ordered">Organization Basic Information Screen </list>
<list label="" type="unordered"> screen ID: SC410010 </list>
<list label="" type="unordered"> screen name: organization basic information screen </list>
<list label="" type="unordered"> brief description: Input basic information about organization. </list>
<list label="" type="unordered"> screen items: </list>
<table>
<row y="1">
<cell x="1" y="1" > screen item name </cell>
<cell x="2" y="1" > required </cell>
<cell x="3" y="1" > type </cell>
<cell x="4" y="1" > the number of characters </cell>
<cell x="5" y="1" > remarks </cell>
</row>
<row y="2">
<cell x="1" y="2" >member code </cell>
<cell x="2" y="2" >O</cell>
<cell x="3" y="2" > text </cell>
<cell x="4" y="2" >10</cell>
<cell x="5" y="2"/>
</row>
<row y="3">
<cell x="1" y="3" >member name </cell>
<cell x="2" y="3" >O</cell>
<cell x="3" y="3" > text </cell>
<cell x="4" y="3" >20</cell>
<cell x="5" y="3"/>
</row>
<row y="4">
<cell x="1" y="4" >search </cell>
<cell x="2" y="4" >-</cell>
<cell x="3" y="4" >button </cell>
<cell x="4" y="4" >-</cell>
<cell x="5" y="4"/>
</row>
<row y="5">
<cell x="1" y="5" >person in charge </cell>
<cell x="2" y="5" >O</cell>
<cell x="3" y="5" > text </cell>
<cell x="4" y="5" >20</cell>
<cell x="5" y="5"> the initial value is login user name
</row>
<row y="6">
<cell x="1" y="6" >registration date </cell>
<cell x="2" y="6" >O</cell>
<cell x="3" y="6" >date </cell>
<cell x="4" y="6" >10</cell>
<cell x="5" y="6"> YYYY/MM/DD form </cell>
</row>
<list label="3.2" type="ordered">Organization Statement Information Screen (Input)
<list label="" type="unordered">screen ID: SC410020 </list>
<list label="" type="unordered">screen name: organization statement information screen (Input) </list>s
<list label="" type="unordered">brief description: Input statement information about organization members. </list>
<list label="" type="unordered">screen items: </list>
...
```

Figure 7

```xml
<screenList sheetName="screen list" />
<screen id="SC310010" name="corporation basic information screen" subsystem="corporation order information management" />
<screen id="SC310020" name="corporation statement information screen (input)" subsystem="corporation order information management" />
<screen id="SC310030" name="corporation information search screen" subsystem="corporation order information management" />
<screen id="SC310040" name="corporation search result list screen" subsystem="corporation order information management" />
<screen id="SC310050" name="corporation statement information screen (query)" subsystem="corporation order information management" />
<screen id="SC310060" name="corporation approval screen" subsystem="corporation order information management" />
<screen id="SC310070" name="corporation statement information screen (approval)" subsystem="corporation order information management" />
<screen id="SC310080" name="corporation form output screen" subsystem="corporation order information management" />
<screen id="SC310090" name="corporation customer registration screen" subsystem="corporation order information management" />
...
<screenList>
<screen id="SC410010" name="organization basic information screen" />
<screen id="SC410020" name="organization statement information screen (input)" />
...
```

Figure 10

```
deduce_output_prep(D){
    generate an output element list ListOut that lists all output elements y ∈ Y included in D in
the depth-first preorder in the following manner.
    (a) if a link exists from an output element y1 to an output element y2 (= y1 is the parent of
y2), y1 precedes y2.
    (b) if links exist from an output element y1 to an output element y2 and to an output
element y3 (= y2 and y3 has the common parent y1), which of y2 and y3 precedes is
determined on the basis of information that orders y2 and y3.
        an example of sort keys:
            1. y-coordinate at the upper-left corner of the element
            2. x-coordinate at the upper-left corner of the element
            3. y-coordinate at the lower-right corner of the element
            4. x-coordinate at the lower-right corner of the element
        return ListOut;
}
```

Figure 11

```
deduce_output(D, input element x){
    among links l ∈ L representing correspondence between input elements and output
elements included in D, list links l whose start point is x and set the list as L1;
    set a list of output elements serving as end points of the links in L1 as Y1;
    set the elements in Y1 sorted in the order of ListOut as Y2;
    return Y2;
}
```

Figure 12

```
deduce_input_prep(D){
    generate an input element list ListIn that lists all input elements x ∈ X included in D in the
depth-first preorder in the following manner.
    (a) if a link exists from an input element x1 to an input element x2 (= x1 is the parent of
x2), x1 precedes x2.
    (b) if links exist from an input element x1 to an input element x2 and to an input element
x3 (= x2 and x3 has the common parent x1), which of x2 and x3 precedes is determined on
the basis of information that orders x2 and x3.
        an example of sort keys:
            1. y-coordinate at the upper-left corner of the element
            2. x-coordinate at the upper-left corner of the element
            3. y-coordinate at the lower-right corner of the element
            4. x-coordinate at the lower-right corner of the element
        return ListIn;
}
```

Figure 13

```
deduce_input(D, input element x, input element y){
    determine n whose end point is y from an output element hierarchy n ∈ N in D to obtain
an output element y0 corresponding to the parent of y;
    determine all links l whose end point is the output element y0 from input-output mapping l
∈ L in D and determine start points xp of the respective links l to obtain a list Xp of the start
points xp;
    determine the first input element x0 preceding x in ListIn among the elements in Xp,
including x itself;
    return x0;
}
```

Figure 14

```
main(D){
    generate new F and initialize as empty.
    preliminary process deduce_output_prep(D);
    extract input elements that do not serve as end points of m ∈ M (= do not have a parent
input element) from all input elements x ∈ X included in D to obtain a list X_root of the
extracted input elements, where the input elements in the X_root are listed in the input sort
order.
    for (element x1 in X_root){
    sub_(D ,x1, F);
    }
    return F;
}
```

Figure 15

```
sub(D, input element x, transformation rules F){
    add a procedure step t = "match a match pattern that is set for x?" to F.
    the list Y1 of output elements for x = deduce_output(D, x);
    foreach (element y1 in Y1){
        determine n whose end point is y1 from the output element hierarchy n ∈ N in D to obtain an
        output element y0 corresponding to the parent of y1;
        if (y0 does not exist (= y1 does not have a parent)){
            add "output q as a child element (or an attribute name) of the root element in the
            transformation-target structured document" to F as a procedure step for the case in which
            the procedure step t results in true.
        }
        else{
            p = an output element that is set as y0
            q = an output element that is set as y1
            an output target x0 = deduce_input(D, x, y1);
            add "output q as a child element (or an attribute name) of an element p generated last by
            x0" to F as a procedure step for the case in which the procedure step t results in true.
        }
    }
    determine child input elements X_child of x, where the input elements in X_child are listed in the
    order of ListIn.
    for (element x1 in X_child){
        sub(D, x1, the case in which the procedure t in F results in true);
    }
}
```

■ (1) if the name matches "screen list" for an input sheet element,
  -(2) output a new screenList element
  -(3) output the sheet name of the sheet matching in (1) as the sheetName attribute of the screenList element generated last in (2)
  -(4) perform the following for all child elements of the sheet element
    ●(5) if x matches 2 or more and y matches 4 or more in input cell elements,
      (6) output a new screen element as a child element of the screenList generated last in (3)
      (7) output text as the value of the id attribute of the screen element generated last in (6)
      (8) output text of a cell element on the right of the cell element matching in (5) as the value of the name attribute of the screen element generated last in (6)
        (9) output text of a cell element on the right of the cell element matching in (8) as the value of the name attribute of the screen element generated last in (6)
        (10) output text of a cell element on the right of the cell element matching in (9) as the value of the subsystem attribute of the screen element generated last in (6)
          (11) output text of a cell element on the right of the cell element matching in (10) as the value of the description attribute of the screen element generated last in (6)

■ (12) if the name matches "subsystem screen definitions" for an input list element,
  -(13) output a new screenList element
■ (14) perform the following for all elements in the range from an input element having a text value matching "subsystem form definitions" to an input element having a text value matching "subsystem screen definitions"
  -(15) if the value of the text matches "screen ID:" for the input list element,
    ●(16) output a new screen element as a child entry of the screenList generated last in (13)
    ●(17) output the text as the value of the id attribute of the screen element generated last in (16)
  -(18) if the value of the text matches "screen name:" for the input list element,
    ●(19) output the text as the value of the name attribute of the screen element generated last in (16)
  -(20) if the value of the text matches "brief description:" for the input list element,
    ●(21) output the text as the value of the description attribute of the screen element generated last in (16)

```
main(document A to be transformed)
    If (A is a spreadsheet file){
        P = sub_spreadsheet(A);
    }
    else if (A is a wordprocessor file){
        P = sub_wordprocessor(A);
    }
    else if (A is a presentation file){
        P = sub_presentation(A);
    }
    else {
        ignore as a document not to be processed;
    }
        return P;
}
```

(a)

```
sub_spreadsheet(document A to be transformed){
    generate a new transformation-source structured document P and add a root
    element e0;
    foreach (sheet s included in A){
        output a sheet element e1 as a child element of e0;
        output the sheet name of s as the value of the name attribute of e1;
        foreach (row r included in s){
            output a row element e2 as a child element of e1;
            output the row number of r as the y attribute value of e2;
            foreach (each cell c in r){
                output a cell element e3 as a child element of e2;
                output the cell value of c as a text value of e3;
            }
        }
    }
    return P;
}
```

```
main(transformation rules F){
    generate a new transformation-target document Q and add a root element;
    p0 = a root element in P;
    q0 = a root element in Q;
    sub(p0, q0, F);
    return Q;
}
```
(a)

```
sub(A) {p, q, transformation rules F){
    q' = transformation rules F (p, q);
    foreach (p1);
        sub(p1, q', transformation rules F)
    }
}
```
(b)

SUPPORTING GENERATION OF TRANSFORMATION RULE

CROSS-REFERENCE TO RELATED APPLICATIONS

This application is a continuation of U.S. Ser. No. 13/545,137, filed Jul. 10, 2012, which claims priority to Japanese Patent Application No. 2011-161047, filed 22 Jul. 2011, and all the benefits accruing therefrom under 35 U.S.C. §119, the contents of which in its entirety are herein incorporated by reference.

BACKGROUND

The present disclosure relates to a technique of transforming a structured document. More specifically, the present disclosure relates to an apparatus, method, and program for supporting generation of a transformation rule, capable of compact graphical representation of a transformation rule for transforming a structured document having a hierarchical structure based on a physical disposition into a structural document having a hierarchical structure based on a logical structure of data content.

Analyzing a design document or a specification document written as a general-format document such as an Office document involves preprocessing in which a document file to be analyzed is dumped to obtain a structured document having a hierarchical structure based on a physical disposition (syntax), which is then transformed into a structured document having a hierarchical structure based on data content (semantics). Accordingly, in the analysis of a project-specific specification document or design document, operations of defining transformation rules adapted to the document to be analyzed are necessary.

Such transformation can be said to be transformation from what does not have a schema into what has a schema, and this characteristic imposes the following requirements for the transformation.

(1) It is desired that information described at different locations or in different manners in the original document should be output as information of logically the same type.

(2) It is desired that information described at one location in the original document should be output separately as logically different pieces of information.

These requirements are especially imposed when the document to be transformed is a word processor file written in project-specific format and notation, or a spreadsheet file in which the document is laid out in spreadsheet cells. The requirements are represented as a transformation rule for outputting a plurality of different elements in the transformation-source structured document as a plurality of elements of the same type in the transformation-target structured document, and a transformation rule for outputting one element in the transformation-source structured document as a plurality of different elements in the transformation-target structured document. This leads to redundant description.

Various techniques exist for transforming a structured document such as a document written in XML (Extensible Markup Language). For example, XSLT (XML Stylesheet Language), which is a standard language for transforming an XML document into another XML document, is used to describe transformation rules for transforming the structure of an XML document into another form (for more details, see http://www.w3.org/TR/xslt20/). MOF (Meta Object Facility) QVT (Queries View Transformations), which is a model transformation standard in a model-driven architecture, defines a standard technique for transformation from a source model into a target model.

The above existing techniques are defined as transformation languages for describing transformation procedures and rules, and are capable of describing transformation in various manners. However, operations of defining transformation can be said to be a kind of programming, which is difficult to master for those who are not expert engineers. In order to address this, techniques (graphical transformation languages) and tools exist for graphically describing transformation procedures and rules. Examples of such techniques and tools include UMLX, and xsl:easy from SoftProject GmbH. UMLX is a graphical description technique for model transformation (for more details, see http://www.eclipse.org/gmt/umlx/doc/), and xsl:easy is a tool for visually designing transformation of an XML document (for more details, see http://xsl-easy.com/4.0/). Advantageously, such techniques and tools are easy to intuitively understand, thereby lowering a barrier of skills required of users.

Other conventional art found in prior-art investigation for the present disclosure includes the following.

JP2006-139441A discloses a document transformation apparatus for transforming information in an untransformed document A into information in a transformed document B, the apparatus including: an input device that reads the document A and the document B; a user interface device that displays items in the document A and items in the document B to manipulate mapping between the items; and a transformation device that reads information on the mapped items, transforms the information in the document A into the information in the document B, and outputs the transformed document (see claim 1 in JP2006-139441A). JP2006-139441A also discloses that one of the documents A and B is a text document and the other is a structured document (see claim 2 in JP2006-139441A). JP2006-139441A further discloses that the mapping between the items in the document A and the items in the document B may be one-to-one, one-to-many, many-to-one, or many-to-many mapping (see claim 6 in JP2006-139441A).

JP2001-344230A discloses a multimedia presentation generation system including: style editing means and mapping rule editing means, serving as a mechanism by which a template description format is separated into a style that specifies a presentation method and a mapping rule that sets mapping between the style and a logical document, and the style and the mapping rule are individually edited; and generating means for generating presentation from the style and the mapping rule generated by the respective editing means. JP2001-344230A also discloses, for the mapping between the logical document and the style, notation that maps one logical document element to a plurality of style elements (see FIG. 5 in JP2001-344230A). As a processing method for the system, JP2001-344230A discloses searching for style elements specified for each logical document element and mapping them (see FIGS. 9 and 7 and paragraph [0023] in JP2001-344230A), and substituting values based on the search result (see FIG. 10 in JP2001-344230A).

SUMMARY

A transformation rule generation supporting method is performed by a computer system for supporting generation of a transformation rule for transforming a transformation-source structured document having a hierarchical structure based on physical disposition of data in the document into a transformation-target structured document having a hierarchical structure based on a logical structure of data content. The method includes the computer system reading graphical representation of a transformation rule from a storage device, the graphical representation of the transformation rule including at least one of: a plurality of links indicating a reduced transformation rule of a one-to-many transformation rule and mapping one node representing an input element that is an element in the transformation-source structured document to a plurality of nodes each representing an output element that is an element in the transformation-target structured document; and a plurality of links indicating a reduced transformation rule of a many-to-one transformation rule and mapping a plurality of nodes each representing an input element in the transformation-source structured document to one node representing an output element in the transformation-target structured document; and in response to that the read graphical representation of the transformation rule is the one-to-many transformation rule, the computer system determining, according to an output sort order, an output order in which each of the output elements represented by the plurality of nodes is output for the input element represented by the one node, the output sort order being a depth-first order in the hierarchical structure of the transformation-target structured document, and in response to that the read graphical representation of the transformation rule is the many-to-one transformation rule, the computer system determining an output target to which the output element represented by the one node is output for each of the input elements represented by the plurality of nodes with reference to an output target of an input element located immediately before each of the input elements in a list in an input sort order of one or more input elements mapped to an output element that is a parent of the output element, the input sort order being a depth-first order in the hierarchical structure of the transformation-source structured document.

BRIEF DESCRIPTION OF THE DRAWINGS

FIG. 3 is a diagram showing an example of a document to be transformed (a screen list definition document);

FIG. 4 is a diagram showing a hierarchical structure resulting from dumping a physical structure of the screen list definition document shown in FIG. 3;

FIG. 6 is a diagram showing a hierarchical structure resulting from dumping a physical structure of the screen list definition document shown in FIG. 5;

FIG. 7 is a diagram showing an example of a hierarchical structure of a transformation-target structured document for the hierarchical structures shown in FIGS. 4 and 6;

FIG. 10 is a conceptual diagram describing pseudo-code of a deduce_output_prep function in an embodiment of the present disclosure;

FIG. 11 is a conceptual diagram describing pseudo-code of a deduce_output function in an embodiment of the present disclosure;

FIG. 12 is a conceptual diagram describing pseudo-code of a deduce_input_prep function in an embodiment of the present disclosure;

FIG. 13 is a conceptual diagram describing pseudo-code of a deduce_input function in an embodiment of the present disclosure;

FIG. 14 is a conceptual diagram describing pseudo-code of a main function as functionality of a restoration unit 115 according to an embodiment of the present disclosure;

FIG. 15 is a conceptual diagram describing pseudo-code of a sub function called from the main function shown in FIG. 14;

FIG. 16 is a diagram showing transformation rules in text form corresponding to the graphical representation of the transformation rules shown in FIG. 9;

FIG. 17 (a) is a conceptual diagram describing pseudo-code of a main function as functionality of an extraction unit 120 according to an embodiment of the present disclosure, and FIG. 17 (b) is a conceptual diagram describing pseudo-code of a sub_spreadsheet function in an embodiment of the present disclosure;

FIG. 18 (a) is a conceptual diagram describing pseudo-code of a main function as functionality of a transformation unit 125 according to an embodiment of the present disclosure, and FIG. 18 (b) is a conceptual diagram describing pseudo-code of a sub function called from the main function shown in FIG. 18 (a);

DETAILED DESCRIPTION

Unfortunately, transformation addressed by the above existing techniques defined as transformation languages is transformation from what does not have a schema into what does not have a schema, or transformation from what has a schema into what has a schema. Consequently, the above existing techniques cannot be applied to transforming a structured document having a syntactic hierarchical structure into a structured document having a semantic hierarchical structure, which can be said to be transformation from what does not have a schema into what has a schema.

Basically, the conventional techniques and existing tools for graphically describing transformation procedures and rules graphically represent the amount of information equivalent to that which would result from procedurally describing a transformation language. Consequently, even by using these techniques and tools, redundancy of description of transformation rules for transforming a structured document having a syntactic hierarchical structure into a structured document having a semantic hierarchical structure directly appears as overlaps in the graphical representation, increasing a user's operational effort.

The technique in JP2006-139441A discloses the capability of the one-to-one, one-to-many, many-to-one, or many-to-many mapping between the items in the document A and the items in the document B. However, as a specific transformation method based on these types of mapping, what is disclosed is only to output the same value for each item if an item in the document A is mapped to a plurality of items in the document B, and to output the sum of values of items if an item in the document B is mapped to a plurality of items in the document A and only in the case of numerical items (see claim 6 in JP2006-139441A). That is, the one-to-many and many-to-one mapping in JP2006-139441A is different from transformation rules based on the above-described requirements (1) and (2). The technique in JP2006-139441A does not address the redundancy of description such that the same item name (i.e., the same type of data rather than the same data) repeatedly appears many times.

Figure 9:
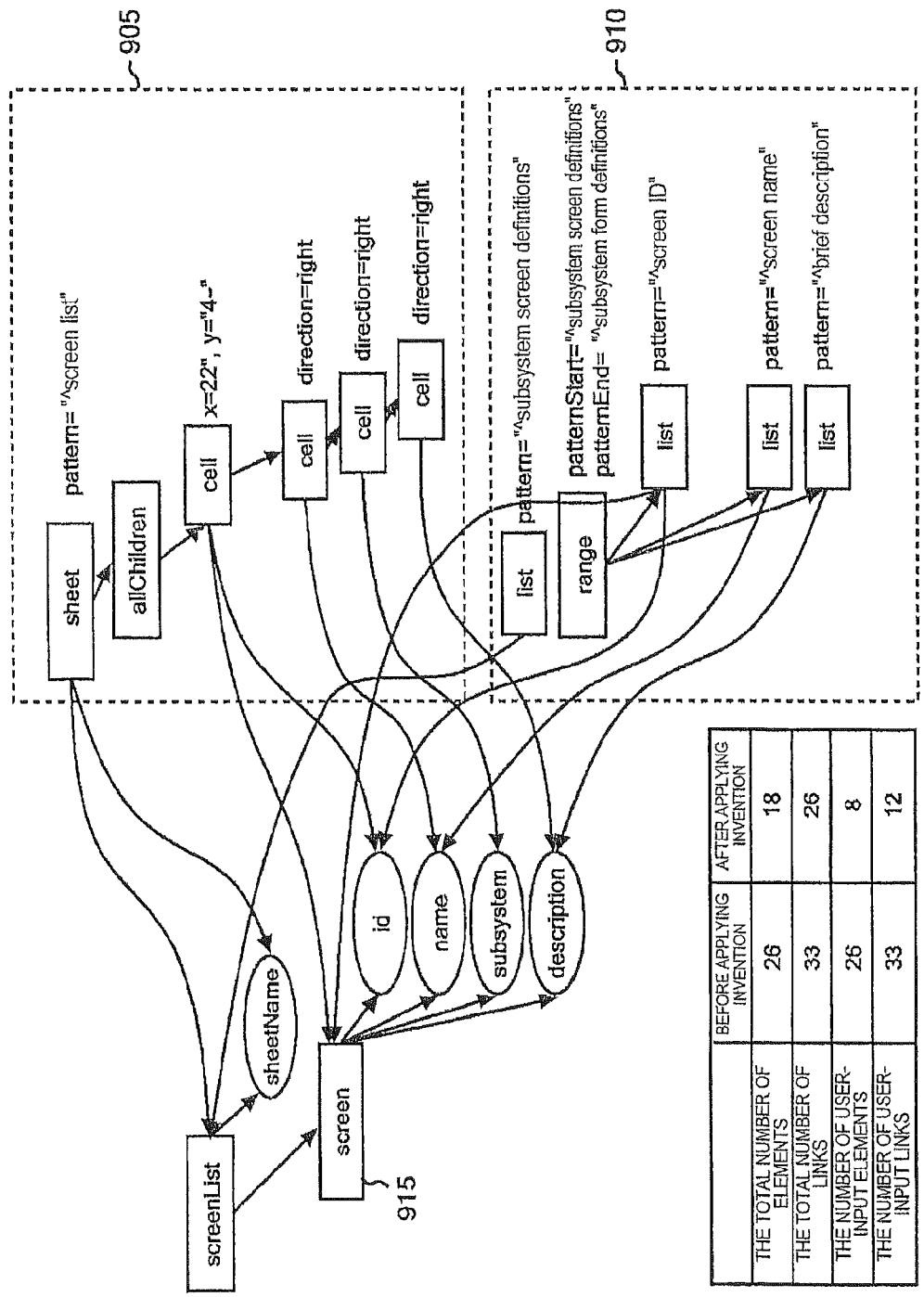
FIG. 9 is a diagram showing graphical representation of reduced transformation rules generated on the basis of the screen list definition documents shown in FIGS. 3 and 5.

Although JP2001-344230A discloses the notation that maps one logical document element to a plurality of style elements, JP2001-344230A describes nothing about the search order in searching for style elements (see step 10 in FIG. 9 in JP2001-344230A) nor about the output order of listed elements (see steps 12, 15, and 16 in FIG. 9 in JP2001-344230A). This is because JP2001-344230A is directed to a simple structure with a depth of 1 as a tree structure of style elements representing multimedia presentation to be output (see FIG. 3 in JP2001-344230A), and therefore the result is uniquely determined by assuming only an implicit order such that "outputting child media from output of a parent card portion." Thus, since JP2001-344230A does not recognize the problem of obscurity in the output order caused by allowing the one-to-many mapping nor disclose any solution for this problem, the technique in JP2001-344230A cannot be applied to a structured document having a hierarchical structure with a depth greater than 1.

The present disclosure has been made in the light of the above inconveniences in the conventional art. The present disclosure provides transformation rule generation supporting apparatus, method, and program for supporting generation of a transformation rule, applicable to any structural document having a hierarchical structure with a depth greater than 1, so that the redundancy of description of transformation rules can be addressed by allowing one-to-many and many-to-one mapping in mapping between elements in a transformation-source structural document having a syntactic hierarchical structure and elements in a transformation-target structural document having a semantic hierarchical structure, while the output order and the output target obscured due to allowing the one-to-many and many-to-one mapping can be uniquely determined through computational processing.

In order to solve the above inconveniences in the conventional art, the present disclosure provides a transformation rule generation supporting apparatus for supporting generation of a transformation rule for transforming a transformation-source structured document having a hierarchical structure based on physical disposition of data in the document into a transformation-target structured document having a hierarchical structure based on a logical structure of data content, characterized by the following features. The transformation rule generation supporting apparatus according to the present disclosure includes: a user interface for generating, displaying, and editing graphical representation of the transformation rule; and a restoration unit for determining a transformation rule in text form from the graphical representation of the transformation rule generated by the user interface. The user interface allows generation of a reduced rule of at least one of a one-to-many transformation rule and a many-to-one transformation rule, the one-to-many transformation rule being indicated by a plurality of links mapping one node representing an input element that is an element in the transformation-source structured document to a plurality of nodes each representing an output element that is an element in the transformation-target structured document, the many-to-one transformation rule being indicated by a plurality of links mapping a plurality of nodes each representing an input element in the transformation-source structured document to one node representing an output element in the transformation-target structured document. For the one-to-many transformation rule, the restoration unit restores reduction of the one-to-many transformation rule by determining, according to an output sort order, an output order in which each of the output elements represented by the plurality of nodes is output for the input element represented by the one node, the output sort order being a depth-first order in the hierarchical structure of the transformation-target structured document. For the many-to-one transformation rule, the restoration unit restores reduction of the many-to-one transformation rule by determining an output target to which the output element represented by the one node is output for each of the input elements represented by the plurality of nodes with reference to an output target of an input element located immediately before each of the input elements in a list in an input sort order of one or more input elements mapped to an output element that is a parent of the output element, the input sort order being a depth-first order in the hierarchical structure of the transformation-source structured document.

In an example, the graphical representation of the transformation rule includes a set of nodes representing input elements, a set of links each representing a hierarchical relationship between two different nodes in the set of the nodes representing the input elements, a set of nodes representing output elements, a set of links each representing a hierarchical relationship between two different nodes in the set of the nodes representing the output elements, and a set of links representing correspondence between the nodes representing the input elements and the nodes representing the output elements. Each node and each link have associated therewith at least one of a pattern for use in matching performed for each element in a structured document to be transformed and an output-related parameter. The restoration unit generates a transformation rule in text form for each processing-target node taken from the set of the nodes representing the input elements in the input sort order, the transformation rule instructing, if matching using the pattern associated with the processing-target node succeeds for an element in the structured document to be transformed, to output an output element represented by a node mapped by a link to the processing-target node, on the basis of the output-related parameter associated with the link and the output-related parameter associated with the node representing the output element.

In an example, the graphical representation of the transformation rule includes, as a specification node, a node representing an input element and specifying a range in the structured document to be transformed in which application of one or more transformation processes each indicated by a link mapping an input element and an output element is attempted.

The specification node may be a specification node that specifies a range in which application of a series of transformation processes indicated by links starting at all child nodes of the specification node is attempted, the range being specified as all children of an element in the structured document to be transformed that matches a pattern associated with a parent node of the specification node. Also, the specification node may be a specification node that specifies a range in which application of a transformation process indicated by a link to be processed last among a plurality of links starting at a parent node of the specification node is attempted, the range being specified as all siblings located after an element in the structured document to be transformed that matches a pattern associated with the parent node of the specification node. Further, the specification node may be a specification node that specifies a range in which application of transformation processes indicated by links starting at all child nodes of the specification node is attempted, the range being specified as a range from an element in the structured document to be transformed that matches an application-range start-position matching pattern associated with the specification node, to an element in the structured document to be transformed that matches an application-range end-position matching pattern associated with the specification node.

In an example, a list of the set of the nodes representing the input elements listed in the input sort order may be generated so that (1) if a link exists from a node xS representing an input element to a node xE representing an input element, the node xS precedes the node xE, and (2) if links exist from a node xS representing an input element to a plurality of nodes xEi (i is a positive integer starting from 1) representing input elements, the order of the plurality of nodes xEi is determined using coordinates at an upper-left corner of each node xEi as sort keys. Coordinates at a lower-right corner of each node xEi may be added as further sort keys, in which case the priority may be in the order of the y-coordinate at the upper-left corner, the x-coordinate at the upper-left corner, the y-coordinate at the lower-right corner, and the x-coordinate at the lower-right corner.

Similarly, a list of the set of the nodes representing the output elements listed in the output sort order may be generated so that (1) if a link exists from a node yS representing an output element to a node yE representing an output element, the node yS precedes the node yE, and (2) if links exist from a node yS representing an output element to a plurality of nodes yEi (i is a positive integer starting from 1) representing output elements, the order of the plurality of nodes yEi is determined using coordinates at an upper-left corner of each node yEi as sort keys. Coordinates at a lower-right corner of each node yEi may be added as further sort keys, in which case the priority may be in the order of the y-coordinate at the upper-left corner, the x-coordinate at the upper-left corner, the y-coordinate at the lower-right corner, and the x-coordinate at the lower-right corner.

In an example, the one-to-many transformation rule causes one node representing an input element having a matching pattern associated therewith to be mapped to a plurality of nodes each representing an output element by a plurality of links each having an output-related parameter associated therewith. The restoration unit generates a transformation rule in text form for the one node representing the input element in the one-to-many transformation rule, the transformation rule instructing, if matching using the matching pattern associated with the one node succeeds for an element in the structured document to be transformed, to output text of the element in the structured document to be transformed as an output element represented by a processing-target node, the processing-target node being each node representing each output element in the one-to-many transformation rule in the output sort order, the text being output after divided or modified according to the output-related parameter associated with a link mapping the processing-target node and the one node representing the input element.

In an example, the many-to-one transformation rule causes a plurality of nodes each representing an input element indicating the same type of content described in a different format or at a different location to be mapped to one node representing an output element. The restoration unit generates a transformation rule in text form for a processing-target node representing each input element in the many-to-one transformation rule, the transformation rule instructing, if matching using the matching pattern associated with the processing-target node succeeds for an element in the structured document to be transformed, to output an element having an element name associated with the node representing the output element in the many-to-one transformation rule as a child of an element that is output last for an input element located immediately before the processing-target node in the input sort order among input elements mapped to an output element represented by a parent node of the node representing the output element in the many-to-one transformation rule, or to output text of the element in the structured document to be transformed as an attribute value of the element that is output last.

In an example, the transformation rule generation supporting apparatus further includes a rule complementing unit for generating the graphical representation of the transformation rule for a selected portion in response to user selection of the portion in the document. If the selected portion is part or all of a table, the rule complementing unit generates: a node representing a parent output element for a first row in the selected portion, the node having associated therewith an element name corresponding to the first row, and a node representing an output element for each cell on the right of a leftmost cell in the first row as a child of the node, the child node having associated therewith an attribute name corresponding to the cell, sequentially from the left; a node representing a parent input element for the leftmost cell in the first row in the selected portion, the node having associated therewith a position-coordinate matching pattern that is set to position coordinates of the leftmost cell, and a link mapping the node to the node representing the parent output element; a node representing an input element for each cell on the right of the leftmost cell in the first row in the selected portion, the node having associated therewith a scanning-direction matching pattern that is set to right, the node being generated as a child of the parent input element node for each of only first two cells, and being generated as a child of an input element node corresponding to an immediately preceding cell for each of remaining cells, sequentially from the left; and a link mapping each node representing the child input element to the node representing the child output element having a corresponding attribute name associated therewith.

If the selected portion is a plurality of section rows, the rule complementing unit generates: a node representing a parent output element for each section row in the selected portion, the node having associated therewith an element name corresponding to the section row; a node representing a parent input element for each section row in the selected portion, the node having associated therewith a list-element matching pattern that is set to a character string of the section row; a link mapping each node representing the parent output element to each corresponding node representing the parent input element; and the specification node immediately after each node representing the parent input element, the specification node having associated therewith specification information specifying a range in the structured document to be transferred in which application of transformation processes indicated by links starting at all child nodes of the specification node is attempted. Here, the specification information includes the application-range start-position matching pattern that is set to the character string of each section row, and the application-range end-position matching pattern that is set to a character string of a next section row.

In an example, the rule complementing unit scans the set of the nodes of the output elements in the output sort order and, in response to detecting two nodes having the same element name or attribute name associated therewith, determines whether or not links exist from a plurality of nodes representing input elements mapped to one node of the two nodes and all child nodes of the one node, respectively, to another node of the two nodes and all child nodes of the other node, and whether or not links exist from a plurality of nodes representing input elements mapped to the other node and all the child nodes of the other node, respectively, to the one node and all the child nodes of the one node, and integrates the detected two nodes if it is determined that neither of the links exist.

In an example, the transformation rule generation supporting apparatus further includes: an extraction unit for extracting elements from a structured document having a hierarchical structure resulting from dumping a physical structure of a document desired to be transformed; and a transformation unit for obtaining the transformation-target structured document by taking each element in the dumped hierarchical structure as a processing target in the depth-first order and applying the transformation rule in text form restored by the restoration unit to the processing target.

The present disclosure has been described above as a transformation rule generation supporting apparatus. The present disclosure may also be embodied as a transformation rule generation supporting method implemented by such a transformation rule generation supporting apparatus, and as a transformation rule generation supporting program installed in and executed by such a transformation rule generation supporting apparatus.

According to the present disclosure, the redundancy of description of transformation rules can be addressed by allowing one-to-many and many-to-one mapping in mapping between elements in a transformation-source structural document having a syntactic hierarchical structure and elements in a transformation-target structural document having a semantic hierarchical structure, while the output order and the output target obscured due to allowing the one-to-many and many-to-one mapping can be uniquely determined through computational processing. As a result, the present disclosure provides transformation rule generation supporting apparatus, method, and program for supporting generation of a transformation rule, applicable to any structural document having a hierarchical structure with a depth greater than 1.

Modes for carrying out the disclosure herein will be described in detail below with reference to the drawings. Embodiments below are not intended to limit the disclosure set forth in the claims, and not all of combinations of features described in the embodiments are necessarily essential for solutions of the disclosure. Throughout the description of the embodiments, like elements are given like numerals.

Figure 1:
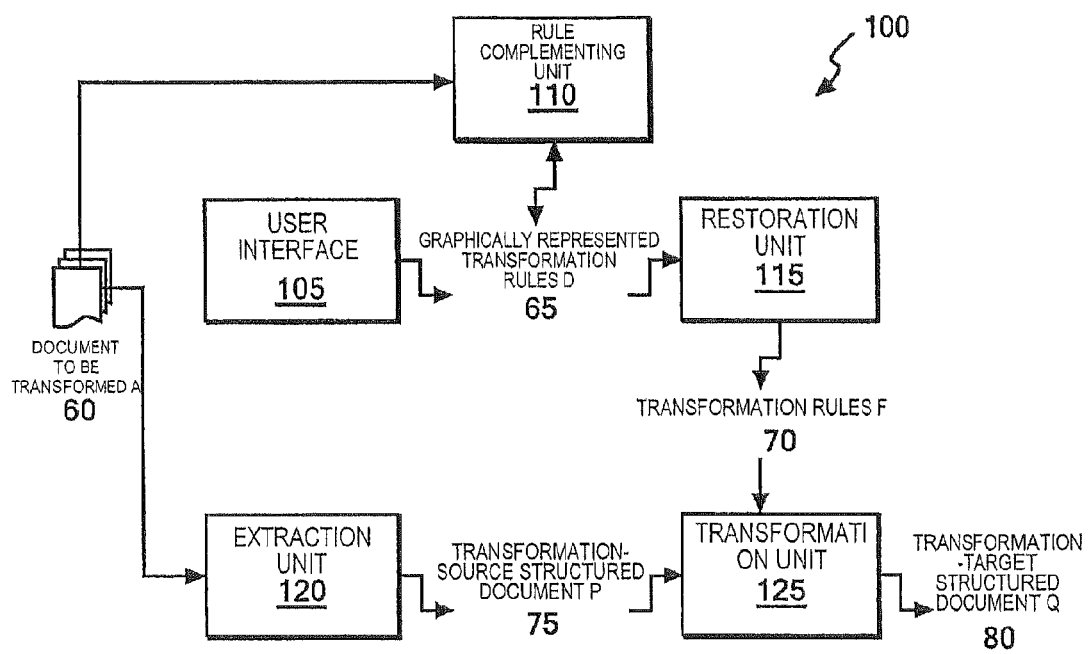
FIG. 1 is a functional block diagram of a transformation rule generation supporting apparatus according to an embodiment of the present disclosure.

FIG. 1 shows functional blocks in a transformation rule generation supporting apparatus 100 according to an embodiment of the present disclosure. The transformation rule generation supporting apparatus 100 includes a user interface 105, a rule complementing unit 110, a restoration unit 115, an extraction unit 120, and a transformation unit 125.

Analyzing a design document or a specification document written as a general-format document such as an Office document involves preprocessing in which a user needs to define transformation rules adapted to the document to be analyzed, for transforming a hierarchical structure based on a physical disposition (syntax) into a hierarchical structure based on data content (semantics). The user interface 105 generates, displays, edits, stores, and reads graphical representation of such transformation rules under the user's instructions.

This transformation to be addressed by the present disclosure can be said to be transformation from what does not have a schema into what has a schema, which raises the concern of the redundancy of description of the transformation rules, as described above. The user interface 105 allows the user to specify one-to-many and many-to-one mapping between elements in a transformation-source structured document having a syntactic hierarchical structure and elements in a transformation-target structured document having a semantic hierarchical structure, and generates graphical representation of reduced transformation rules. Thus, the user interface 105 eliminates overlaps in the graphical representation to provide transformation rules D 65 in the form of more compact and easily viewable graphical representation.

The graphically represented transformation rules D 65 are also generated by the rule complementing unit 110. The rule complementing unit 110 automatically generates graphical representation of reduced transformation rules for a selected portion in response to the user's selection of the portion in the transformation-source structured document before being dumped, i.e., an original document. The automatic generation of part of the graphically represented transformation rules D 65 by the rule complementing unit 110 reduces the operational load on the user for generating the transformation rules using the user interface 105.

The graphically represented transformation rules D 65, generated by the user interface 105 or by both the user interface 105 and the rule complementing unit 110, is restored by the restoration unit 115 to a computer-processable form, for example non-reduced transformation rules F 70 in text form. That is, as a result of allowing one-to-many and/or many-to-one mapping, the generated graphically represented transformation rules D 65 undesirably have obscurity in the output order and output targets. Through computational processing, the restoration unit 115 uniquely determines the obscured output order and output targets and generates the non-reduced transformation rules F 70.

The extraction unit 120 receives, as an input, a document A 60 to be transformed. The extraction unit 120 dumps a physical structure of the document A 60 and outputs a transformation-source structured document P 75 having a hierarchical structure of the physical structure. The transformation unit 125 receives the transformation-source structured document P 75 and the transformation rules F 70 as inputs. The transformation unit 125 takes each element in the hierarchical structure of the structured document P 75 as a processing target in the depth-first order and applies the transformation rules F 70 to the processing target. Thus, the transformation unit 125 outputs a transformation-target structured document Q 80. Details of each component of the transformation rule generation supporting apparatus 100 will be described below one by one.

The user interface 105 generates, displays, edits, stores, and reads the graphically represented transformation rules D 65 for transforming a transformation-source structured document having a syntactic hierarchical structure into a transformation-target structured document having a semantic hierarchical structure, under the user's instructions.

The graphically represented transformation rules D 65 generated by the user interface 105 includes: a set X of nodes x representing input elements that are elements in the transformation-source structured document; a set M of links m each representing a hierarchical relationship between two different nodes x1 and x2 in the set X; a set Y of nodes y representing output elements that are elements in the transformation-target structured document; a set N of links n each representing a hierarchical relationship between two different nodes y1 and y2 in the set Y; and a set L of links l representing correspondence between the nodes x representing the input elements and the nodes y representing the output elements. If an input element represented by a node x1 is the parent of an input element represented by a node x2 in the hierarchical structure, the node x1 is the start point and the node x2 is the end point of a link m connecting the nodes x1 and x2. Similarly, if an output element represented by a node y1 is the parent of an output element represented by a node y2 in the hierarchical structure, the node y1 is the start point and the node y2 is the end point of a link n connecting the nodes y1 and y2. Each node x∈X can be the start point of a plurality of links l∈L, and each node y∈Y can be the end point of a plurality of links l∈L.

Each node and each link has associated therewith at least one of: a pattern for use in matching performed for each element in the structured document to be transformed; and output-related parameters. The output-related parameters include: an element name of an element to be output; an attribute name of the element to be output; a character string matching pattern and a replacing character string for an attribute value to be output; and the manner of adding the character string (e.g., specification as to whether the character string is added at the end or the beginning of the attribute value, and specification of a separator for use in the addition). Details will be described below in relation to the restoration unit 115.

The graphically represented transformation rules D 65 also include specification nodes as nodes representing input elements. A specification node is a node specifying a range, in the structured document to be transformed, in which application of transformation processes each indicated by a link mapping a node representing an input element to a node representing an output element is attempted. In this embodiment, three nodes including an allChildren node, an allSiblingsAfter node, and a range node will be described as specification nodes.

The allChildren node is a specification node that specifies a range in which application of a series of transformation processes indicated by links l whose start point is all child nodes of the allChildren node is attempted. This range is specified as all children of an element in the structured document to be transformed that matches a pattern associated with a parent node of the allChildren node.

The allSiblingsAfter node is a specification node that specifies a range in which application of a transformation process indicated by a link l to be processed last among a plurality of links l whose start point is a parent node of the allSiblingsAfter node is attempted. This range is specified as all siblings located after an element in the structured document to be transformed that matches a pattern associated with the parent node of the allSiblingsAfter node.

The range node is a specification node that specifies a range in which application of transformation processes indicated by all links l whose start point is child nodes of the range node is attempted. This range is specified as the range from an element in the structured document to be transformed that matches an application-range start-position text pattern associated with the range node, to an element in the structured document to be transformed that matches an application-range end-position text pattern associated with the range node.

For generating the graphically represented transformation rules D 65 as described above, the user interface 105 may provide functionality for performing the following operations.

(1) Add nodes and links constituting the graphically represented transformation rules D 65 by selecting them from a menu or a palette.
(2) Change positions and sizes of the nodes and the links.
(3) Set patterns and parameters for the nodes and the links.
(4) Delete the nodes and the links.
(5) Store and read the graphically represented transformation rules D 65.

Based on the user's operations, the user interface 105 generates a one-to-many transformation rule indicated by a plurality of links l that map one node x representing an input element to a plurality of nodes y each representing an output element, thereby allowing generation of a reduced transformation rule. Similarly, based on the user's operations, the user interface 105 generates a many-to-one transformation rule indicated by a plurality of links l that map a plurality of nodes x each representing an input element to one node y representing an output element, thereby allowing generation of a reduced transformation rule.

Figure 2:
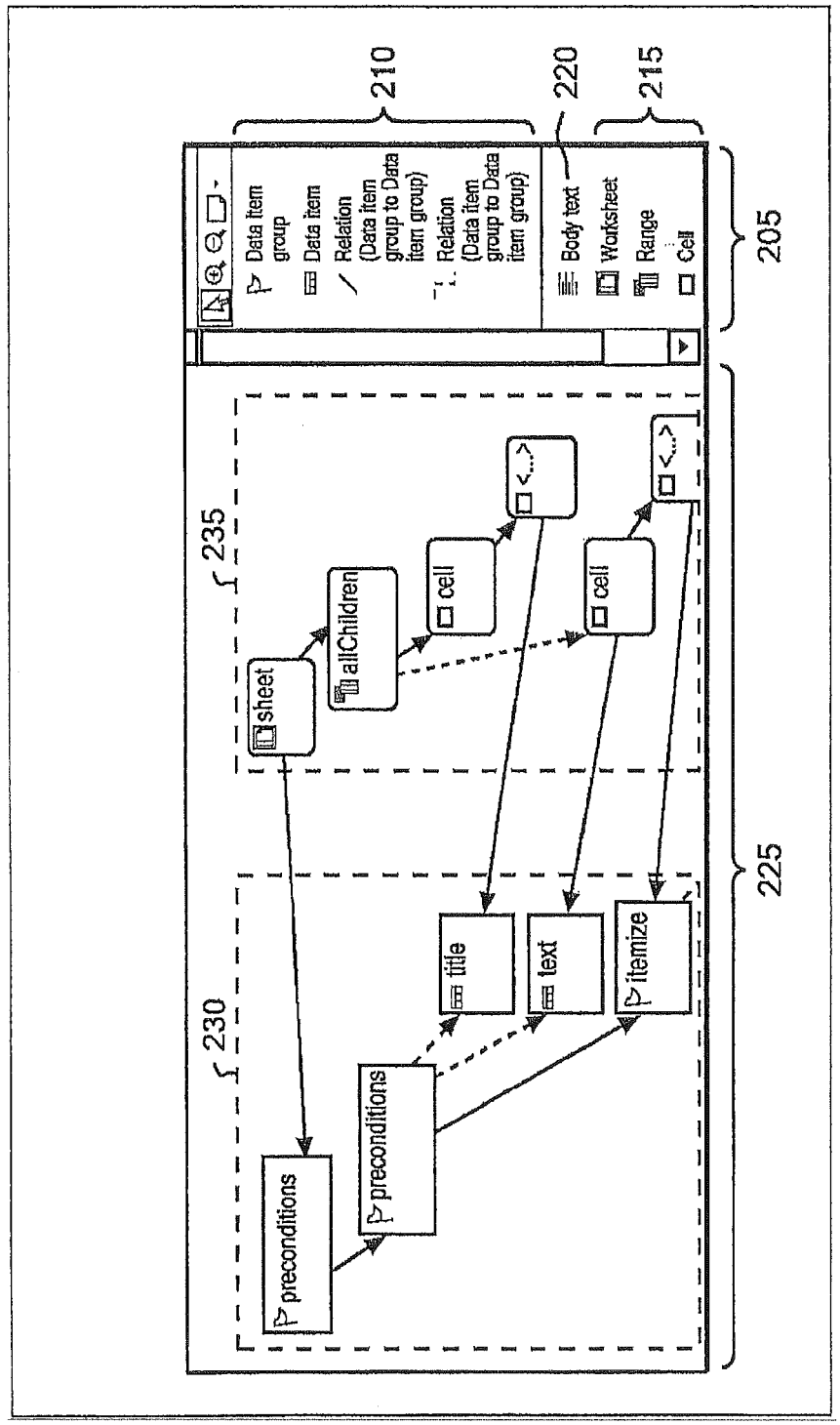
FIG. 2 is a diagram showing an example of a user interface according to an embodiment of the present disclosure.

FIG. 2 shows an example of the user interface 105. The user interface 105 shown in FIG. 2 displays a palette 205 for selecting and adding elements constituting the graphically represented transformation rules D 65 on the observer's right on the screen. The palette 205 includes: a plurality of icons 210 for generating nodes y representing output elements, and links n each representing a hierarchical relationship between two different nodes y1 and y2 in the set Y; and a plurality of icons 215 for generating nodes x representing input elements. The palette 205 also includes an icon 220 for setting parameters for the nodes and the links Although not shown, the palette 205 may further include a plurality of icons for generating links m each representing a hierarchical relationship between two different nodes x1 and x2 in the set X, and links l each representing correspondence between a node x representing an input element and a node y representing an output element.

The user interface 105 shown in FIG. 2 also displays a working area 225 for generating the graphically represented transformation rules D 65 on the observer's left on the screen. The user can generate the set Y of the nodes y representing output elements and the set N of the hierarchical relationships n between the nodes y 230 by repeating left-clicking a mouse at a position in the working area 225 where the user desires to generate a node or a link while selecting one of the plurality of icons 210 in the palette 205. The user can also generate the set X of the plurality of nodes x representing input elements and the set M 235 of the hierarchical relationships m 235 (where 235 includes the relationships of the nodes, not just nodes themselves) by repeating left-clicking the mouse at a position in the working area 225 where the user desires to generate a node or a link while selecting one of the icons 215 in the palette 205. The user can further set parameters for any node or link generated in the working area 225 by clicking the mouse on the node or link while selecting the icon 220 in the palette 205. It is to be noted that the user interface 105 shown in FIG. 2 is an example for illustrative purposes and is not limited to the form shown in FIG. 2.

No limitations are imposed on the position and size of each of the nodes x and y constituting the graphically represented transformation rules D 65, as long as the syntactic hierarchical structure of the transformation-source structural document is correctly represented by the set M of the links m and the semantic hierarchical structure of the transformation-target structural document is correctly represented by the set N of the links n. Of course, information about these hierarchical structures may be separately provided in advance. The position and size of each of the nodes x and y in this embodiment are determined so that the input sort order, which is the depth-first order in the hierarchical structure of the transformation-source document, and the output sort order, which is the depth-first order in the hierarchical structure of the transformation-target structured document, are determined in a manner to be described below.

In this embodiment, the input sort order is determined as follows.

(1) If a link exists from a node x1 representing an input element to a node x2 representing an input element, the node x1 precedes the node x2.

(2) If links exist from a node x1 representing an input element to a plurality of nodes xi (i is a positive integer starting from 2) representing input elements, the order of the nodes xi is determined using the coordinates at the upper-left corner of each node xi as sort keys. The coordinates at the lower-right corner of each node xi may be added as further sort keys, in which case the priority may be in the order of the y-coordinate at the upper-left corner, the x-coordinate at the upper-left corner, the y-coordinate at the lower-right corner, and the x-coordinate at the lower-right corner, of the node xi.

Similarly, in this embodiment, the output sort order is determined as follows.

(1) If a link exists from a node y1 representing an output element to a node y2 representing an output element, the node y1 precedes the node y2.

(2) If links exist from a node y1 representing an output element to a plurality of nodes yi (i is a positive integer starting from 2) representing output elements, the order of the nodes yi is determined using the coordinates at the upper-left corner of each node yi as sort keys. The coordinates at the lower-right corner of each node yi may be added as further sort keys, in which case the priority may be in the order of the y-coordinate at the upper-left corner, the x-coordinate at the upper-left corner, the y-coordinate at the lower-right corner, and the x-coordinate at the lower-right corner, of the node yi.

The rule complementing unit 110 automatically generates the graphically represented transformation rules D 65 for a selected portion in response to the user's selection of the portion in the document to be transformed. More specifically, the rule complementing unit 110 determines whether or not the selected portion is a table, and if the selected portion is a table, generates the graphically represented transformation rules D 65 corresponding to the table and not including reduced transformation rules. The rule complementing unit 110 also determines whether or not the selected portion is section rows, and if the selected portion is section rows, generates the graphically represented transformation rules D 65 corresponding to the section rows and not including reduced transformation rules. The rule complementing unit 110 then searches the automatically generated graphically represented transformation rules D 65. If common child elements are found, the rule complementing unit 110 aggregates these elements and finally outputs the graphically represented transformation rules D 65 including reduced transformation rules. Details of processing by the rule complementing unit 110 will be described below with reference to FIGS. 3 to 9.

Figure 5:
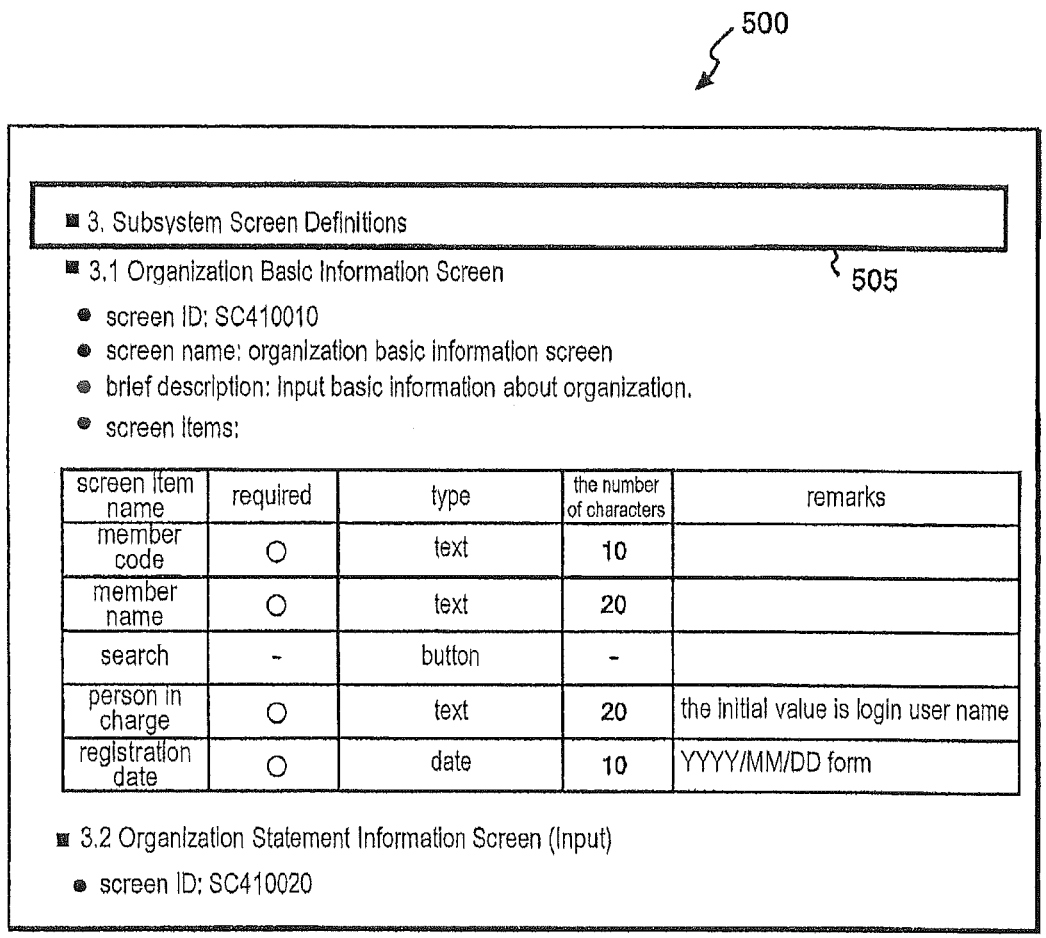
FIG. 5 is a diagram showing another example of a document to be transformed (another screen list definition document according to the same specifications as the screen list definition document shown in FIG. 3)
Figure 8:
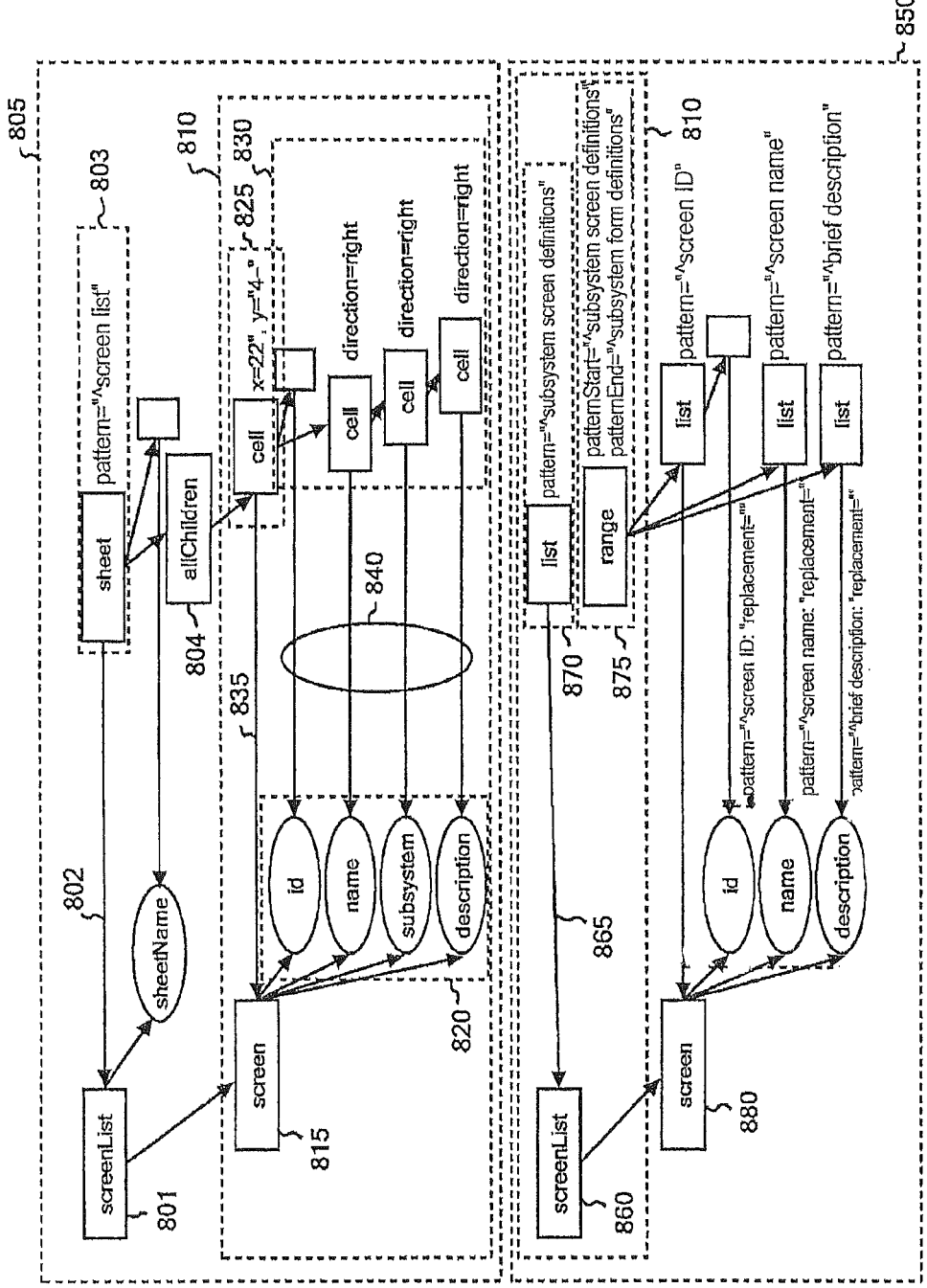
FIG. 8 is a diagram showing graphical representation of non-reduced transformation rules generated on the basis of the screen list definition documents shown in FIGS. 3 and 5.

FIG. 3 shows a screen list definition document as an exemplary document to be transformed. FIG. 4 shows a hierarchical structure resulting from dumping a physical structure of the screen list definition document shown in FIG. 3. FIG. 5 shows another screen list definition document as an exemplary document to be transformed. FIG. 6 shows a hierarchical structure resulting from dumping a physical structure of the screen list definition document shown in FIG. 5. FIG. 7 shows an example of a hierarchical structure of a transformation-target structured document for the hierarchical structures shown in FIGS. 4 and 6. FIG. 8 shows graphical representation of non-reduced transformation rules generated on the basis of the screen list definition documents shown in FIGS. 3 and 5. FIG. 9 shows graphical representation of reduced transformation rules generated on the basis of the screen list definition documents shown in FIGS. 3 and 5.

In the screen list definition document shown in FIG. 3, the list is described in tabular form on a spreadsheet. In the screen list definition document shown in FIG. 5, the list is described in itemized form in a Word document. However, specifications of the two definition documents are the same. It is therefore desired to integrate the two screen list definition documents into one screen list definition document by transforming the respective hierarchical structures of the physical structures into the hierarchical structure shown in FIG. 7. Many of graphically represented transformation rules for this purpose can be automatically generated through processing by the rule complementing unit 110 to be described below. Firstly, with reference to FIGS. 3, 4, 7, and 8, automatic table clipping-out processing will be described for the case in which the selected portion is all or part of a table. Then, with reference to FIGS. 5, 6, 7, and 8, automatic section clipping-out processing will be described for the case in which the selected portion is a section. Lastly, with reference to FIGS. 8 and 9, aggregation processing will be described.

In the automatic table clipping-out processing, the rule complementing unit 110 first obtains information specifying a user-selected portion (see a portion 305 in a spreadsheet 300 in FIG. 3). The rule complementing unit 110, having recognized that the selected portion is part or all of a table according to the obtained information, performs the following processes.

(1) For the first row (see a row 310 in the spreadsheet 300 in FIG. 3) in the selected portion, generate a node (see a node 815 in FIG. 8) representing an output element and having associated therewith an element name corresponding to the first row.

(2) For cells on the right of the leftmost cell in the first row (see cells with coordinates (B, 4), (C, 4), (D, 4), and (E, 4) in the spreadsheet 300 in FIG. 3), generate nodes (see a node set 820 in FIG. 8) representing output elements and having associated therewith attribute names corresponding to the respective cells, sequentially from the left, as children of the above node representing the output element.

(3) For the leftmost cell in the first row in the selected portion (see a cell with the coordinates (A, 4) in the spreadsheet 300 in FIG. 3), generate a node (see a node 825 in FIG. 8) representing a parent input element and having associated therewith a position-coordinate matching pattern that is set to the position coordinates of the leftmost cell. Generate a link (see a link 835 in FIG. 8) that maps the generated node to the above node representing the parent output element.

(4) For the cells on the right of the leftmost cell in the first row in the selected portion (see the cells with the coordinates (B, 4), (C, 4), (D, 4), and (E, 4) in the spreadsheet 300), generate nodes (see a node set 830 in FIG. 8) of input elements and having associated therewith a scanning-direction matching pattern that is set to right. Sequentially from the left, nodes for only the first two cells are generated as children of the above parent input element, and nodes for the remaining cells are each generated as a child of a node of an input element corresponding to an immediately preceding cell.

(5) Generate links (see a link set 840 in FIG. 8) that each maps a node representing a child input element to a node representing a child output element having a corresponding attribute name associated therewith.

If the user-selected portion is the entire spreadsheet (see a portion 315 in the spreadsheet 300 in FIG. 3), the following additional processes precede the above processes.

(1') For the selected sheet (see the portion 315 in the spreadsheet 300 in FIG. 3), generate a node (see a node 801 in FIG. 8) representing an output element and having associated therewith an element name corresponding to the selected sheet.

(2') For the selected sheet (see the portion 315 in the spreadsheet 300 in FIG. 3), generate a node (see a node 803 in FIG. 8) of an input element and having associated therewith a sheet element text pattern that is set to a sheet name of the selected sheet. Generate a link (see a link 802 in FIG. 8) that maps the generated node to the above node representing the output element.

(3') Generate an allChildren node (see a node 804 in FIG. 8) as a child of the above node of the input element.

The node (see the node 825 in FIG. 8) representing the parent input element generated for the leftmost cell in the first row in the selected portion (see the cell with the coordinates (A, 4) in the spreadsheet 300 in FIG. 3) becomes a child of the allChildren node.

If the user-selected portion is the whole of a certain row in the spreadsheet, the rule complementing unit 110 performs the following processes in place of the above processes (1) to (5).

(1) For the selected row, generate a node representing a parent output element and having associated therewith an element name corresponding to the selected row.

(2) As a child of the above node representing the output element, generate a node representing an output element and having associated therewith a character string of the selected row as an attribute name.

(3) For the leftmost non-blank cell in the selected row, generate a node representing a parent input element and having associated therewith a character-string matching pattern that is set to a value of the leftmost cell. Generate a link that maps the generated node to the above node representing the parent output element.

(4) As a child of the node representing the parent input element, generate a node representing an input element. Generate a link that maps the generated node to the above node representing the child output element.

(5) As a child of the above node representing the child input element, generate an allSiblingsAfter node. Generate a link that maps the generated node to the above node representing the child output element.

In the automatic section clipping-out processing, the rule complementing unit 110 first obtains information specifying a user-selected portion (see a portion 505 in a Word document 500 in FIG. 5, where, although not shown, the selected portion also includes a section row "-4. Subsystem Statement Definition"). The rule complementing unit 110, having recognized that the selected portion is a section according to the obtained information, performs the following processes.

(1) For each section row (see the portion 505 in the Word document 500 in FIG. 5, where, although not shown, the selected portion also includes the section row "-4. Subsystem Statement Definition") in the selected portion, generate a node (see a node 860 in FIG. 8) representing an output element and having associated therewith an element name corresponding to a character string (section name) of the section row.

(2) For each section row (see the portion 505 in the Word document 500 in FIG. 5, where, although not shown, the selected portion also includes the section row "-4. Subsystem Statement Definition") in the selected portion, generate a node (see a node 870 in FIG. 8) representing an input element and having associated therewith a list element text pattern that is set to the character string of the section row. Generate a link (see a link 865 in FIG. 8) that maps the generated node to the corresponding node representing the parent output element.

(3) Generate a range node (see a node 875 in FIG. 8) immediately after each node representing the parent input element. As specification information on the range node, the text pattern of the application-range start-position is set to the character string of each section row, and the text pattern of the application-range end-position is set to a character string of the next section row.

In the automatic table clipping-out processing and the automatic section clipping-out processing described above, each element name or attribute name may be determined on the basis of a cell value in the selected portion of the table, and on the basis of a character string (section name) of each section row, respectively. Specifically, the element name or attribute name may be determined in the following steps.

(1) Convert a character string that is a cell value, or a character string (section name) of each section row. The conversion may be performed with reference to a table created in advance for general words and phrases, in which character string patterns are mapped to name patterns. Alternatively, a general translation system may be used.

(2) From the converted character string, delete character portions other than characters available for an element name/attribute name.

(3) Add a random character string as necessary to make the character string a valid value as an element name/attribute name. The position of each automatically generated node is as described for the user interface 105. As an example, the position may be determined according to the following rule: in a two-dimensional coordinate system with the x-coordinate (horizontal direction) and the y-coordinate (vertical direction), a child is located at the lower-right of its parent, and children of the same parent are located at positions with the same x-coordinate and different y-coordinates.

With either of the above-described methods or with the user interface 105, or with the both, the graphically represented transformation rules D 65 not including reduced transformation rules are generated. Then, the rule complementing unit 110 performs the following processes for the graphically represented transformation rules D 65 not including reduced transformation rules, in order to finally generate the graphically represented transformation rules D 65 including reduced transformation rules.

(1) Scan the set of the nodes of the output elements in the output sort order to detect two nodes y1 and y2 having the same element name or attribute name associated therewith.

(2) For the detected nodes y1 and y2, determine whether or not at least one link 1 exists, from a plurality of nodes representing input elements mapped to the node y1 and all its child nodes respectively, to the node y2 and all its child nodes, and whether or not at least one link 2 exists, from a plurality of nodes representing input elements mapped to the node y2 and all its child nodes respectively, to the node y1 and all its child nodes.

(3) If it is determined in (2) that neither links 1 nor links 2 exist, integrate the detected two nodes y1 and y2. Specifically, replace the two nodes y1 and y2 with an integrated node y0, and connect, to the node y0, all the links connected with the nodes y1 and y2.

Different elements cannot be integrated even if they have the same attribute. On the other hand, the same element can be integrated even if they have different attributes (including any of cases "all attributes are the same," "attributes are partially the same," and "all attributes are different"). Referring to the graphically represented transformation rules D 65 not including reduced transformation rules shown in FIG. 8, nodes 815 and 880 have the same element name "screen." As to children of these nodes, however, the node 815 has a child with an attribute name "subsystem" while the node 880 has no such a child (corresponding to "attributes are partially the same"). Nonetheless, as shown by a node 915 in FIG. 9, the nodes 815 and 880 can be integrated without problems. A set of nodes representing input elements within a rectangle 805 in FIG. 8 corresponds to a set of nodes 905 representing input elements in FIG. 9. A set of nodes representing input elements within a rectangle 850 in FIG. 8 corresponds to a set of nodes 910 representing input elements in FIG. 9. A table at the lower left in FIG. 9 shows a state before application of the present disclosure (without reduction and without automatic generation by the rule complementing unit 110), and a state after application of the present disclosure (with reduction and with automatic generation of the rectangular portions 805 and 810 in FIG. 8 by the rule complementing unit 110). It can be seen from comparison between the two states that the present disclosure improves both the viewability of the graphically represented transformation rules and the operational load on the user.

The restoration unit 115 receives, as an input, the graphically represented transformation rules D 65 including reduced transformation rules generated by the user interface 105 or by both the user interface 105 and the rule complementing unit 110. The restoration unit 115 converts the graphically represented transformation rules D 65 into complete transformation rules in text form while restoring the reduction, and outputs the transformation rules F70. More specifically, the restoration unit 115 generates a transformation rule in text form for each processing-target node taken from the set of the nodes representing the input elements included in the graphically represented transformation rules D 65 in the input sort order. The transformation rule in text form instructs, if matching using a pattern associated with the processing-target node succeeds for an element in the structured document to be transformed, to output an output element represented by a node mapped by a link to the processing-target node, on the basis of output-related parameters associated with the link and output-related parameters associated with the node representing the output element.

In the above processing, for a one-to-many transformation rule, the restoration unit 115 restores the reduction by determining, according to the output sort order, the output order in which each of a plurality of output elements represented by a plurality of nodes is output for an input element represented by one node. This will be described more specifically. The one-to-many transformation rule causes one node representing an input element having a matching pattern associated therewith to be mapped to a plurality of nodes each representing an output element by a plurality of links each having output-related parameters associated therewith. In this situation, the restoration unit 115 generates a transformation rule in text form for the one node representing the input element in the one-to-many transformation rule. The transformation rule in text form instructs, if matching using the matching pattern associated with the node succeeds for an element in the structured document to be transformed, to output text of the matching element as an output element represented by a processing-target node. The processing-target node is each node representing each output element in the one-to-many transformation rule in the output sort order. The text of the matching element is output after divided or modified according to output-related parameters associated with a link that maps the one node representing the input element and the processing-target node.

Here, the output-related parameters associated with the links in the one-to-many transformation rule will be described in detail. The output-related parameters are information specifying the manner of dividing or modifying the content described at one location indicated by one node representing an input element in order to output the content to a plurality of output elements represented by a plurality of nodes. Specifically, the information includes a character-string match pattern and a replacing character string for an output value. The match pattern may be set in regular expression, and may be a character string replacement pattern in Java®.

As an example, consider the case in which the value of a cell in the structured document to be transformed that matches a match pattern associated with an input element X1 corresponding to a cell is "ABC&DEF," and this value is to be output as divided into two output elements Y1 and Y2. Then, as the output-related parameters associated with a link that connects X1 and Y1, the match pattern is set to "&.*" and the replacing character string is set to "(blank)." As a result, according to this information, "ABC" is output to the output element Y1. Similarly, as the output-related parameters associated with a link that connects X1 and Y2, the match pattern is set to ".*&" and the replacing character string is set to "(blank)." As a result, according to this information, "DEF" is output to the output element Y2. It is to be noted that ".*" represents "an arbitrary character string composed of zero or more characters" in regular expression. Therefore, the above settings means "remove & and the following character string" and "remove & and the preceding character string," respectively.

In the above processing, for a many-to-one transformation rule, the restoration unit 115 restores the reduction by determining an output target to which an output element represented by one node is output for each of a plurality of input elements represented by a plurality of nodes with reference to an output target of an input element located immediately before each of the input elements in a list in input sort order of one or more input elements mapped to an output element that is the parent of the output element. This will be described in more detail. The many-to-one transformation rule causes a plurality of nodes each representing an input element indicating the same type of content described in a different format or at a different location to be mapped to one node representing an output element. The restoration unit 115 generates a transformation rule in text form for a processing-target node representing each input element in the many-to-one transformation rule. The transformation rule in text form instructs, if matching using a matching pattern associated with the processing-target node succeeds for an element in the structured document to be transformed, to output an element having an element name associated with the node representing the output element in the many-to-one transformation rule as a child of an element that is output last for an input element located immediately before the processing-target node in the input sort order among one or more input elements mapped to an output element represented by a parent node of the node representing the output element in the many-to-one transformation rule, or to output text of the element in the structured document to be transformed as an attribute value of the element that is output last.

In the many-to-one transformation rule, if the same output target is determined with the above method for a plurality of nodes representing input elements, the output-related parameters are associated with each link that maps each of the nodes representing input elements to the node representing the one output element. The output-related parameters specify the manner of adding a character string to the attribute value, for example it is information instructing to add a character string at the beginning or the end of the attribute value, or information specifying a separator for use in the addition.

As an example, consider the case in which there is a node X1, which has a child node X2, which further has a child node X3, each representing an input element, and a link from each of the three nodes X1, X2, and X3 connects to a node Y representing an output element to which attribute values are to be output. The nodes X1, X2, and X3 are in parent-child relationships in this order, and the output target determined with the above method is the same in this case. It is assumed here that the following output-related parameters are associated with the link from the node X2 to the node Y.

addition mode: add at the beginning
   separator for addition: ":"

Similarly, it is assumed that the following output-related parameters are associated with the link from the node X3 to the node Y.

addition mode: add at the end
   separator for addition: "-"

It is also assumed that, if match patterns associated with the nodes X1, X2, and X3 match, corresponding values are output as "screen A," "ID123," and "item H," respectively. Then, output to the node Y representing the output node is performed in the order of X1, X2, and X3 as follows. Firstly, output from X1 to Y is performed, at which point the output attribute value corresponding to Y is "screen A." Then, output from X2 to Y is performed, at which point the output attribute value corresponding to Y is "ID123:screen A." Lastly, output from X3 to Y is performed, at which point the output attribute value corresponding to Y is "ID123:screen A-item H."

Now, with reference to pseudo-code shown in FIGS. 10 to 15, the processing by the restoration unit 115 will be described. FIG. 10 is a conceptual diagram describing pseudo-code of a deduce_output_prep function directly called from a main function that provides functionality of the restoration unit 115. FIG. 11 is a conceptual diagram describing pseudo-code of a deduce_output function indirectly called from the main function. FIG. 12 is a conceptual diagram describing pseudo-code of a deduce_input_prep function indirectly called from the main function. FIG. 13 is a conceptual diagram describing pseudo-code of a deduce_input function indirectly called from the main function. FIG. 14 is a conceptual diagram describing pseudo-code of the main function. FIG. 15 is a conceptual diagram describing pseudo-code of a sub function directly called from the main function. For simplicity, in the description below, nodes representing input elements and output elements will be simply referred to as input elements and output elements, respectively.

The deduce_output_prep function shown in FIG. 10 is a function called for determining the output order in a one-to-many transformation rule, and it is a function for determining the output sort order. For the graphically represented transformation rules D 65 passed as an argument, the function returns an output element list ListOut that lists all the output elements y (y∈Y) included in the transformation rules D 65 in the depth-first order. As described above, in this embodiment, the output sort order is determined on the basis of the position and size of each node. Details of this have been described above and therefore will not be described here.

The deduce_output function shown in FIG. 11 is also a function called for determining the output order in a one-to-many transformation rule, and it is a function for determining the output order for a particular input element x specified by an argument. In the deduce_output function, firstly, among the links 1 (l∈L) representing correspondence between the input elements and the output elements included in the graphically represented transformation rules D 65 passed as an argument, links 1 whose start point is the particular element x are listed and set as L1. Next, Y1 is set as a list of output elements serving as end points of the links in L1. Next, Y2 is set as the elements in Y1 sorted in the order of ListOut determined with the deduce_output_prep function. Lastly, Y2 is returned as the list of the output elements for the input element x in the output order.

The deduce_input_prep function shown in FIG. 12 is a function called for determining an output target in a many-to-one transformation rule, and it is a function for determining the input sort order. For the graphically represented transformation rules D 65 passed as an argument, the function returns an input element list ListIn that lists all the input elements x (x∈X) included in the transformation rules D 65 in the depth-first order. As described above, in this embodiment, the input sort order is determined on the basis of the position and size of each node. Details of this have been described above and therefore will not be described here.

The deduce_input function shown in FIG. 13 is also a function called for determining an output target in a many-to-one transformation rule, and it is a function for determining an output target for a particular input element x and a particular output element y specified by arguments. In the deduce_input function, firstly, from the output element hierarchy n (links between the output elements, i.e., n∈N) included in the graphically represented transformation rules D 65 passed as an argument, a link whose end point is the particular element y is determined to obtain a parent output element y0 of the output element y. Next, from the links 1 (l∈L) representing correspondence between the input elements and the output elements in the graphically represented transformation rules D 65, all links 1 whose end point is the output element y0 are determined to obtain Xp that lists input elements xp serving as start points of the determined links 1. Next, among the elements in the Xp, including the particular input element x itself, the first input element x0 preceding the input element x is determined in the ListIn determined with the deduce_input_prep function. Lastly, the input element x0 is returned as reference information for determining an output target of a link that maps the input element x and the output element y.

The main function shown in FIG. 14 is a function corresponding to the entire processing by the restoration unit 115, and it is a function for generating and outputting the transformation rules F 70 from the graphically represented transformation rules D 65 received as an argument. In the main function, firstly, new transformation rules F 70 in text form are created and initialized as empty. Next, as a preliminary process, the deduce_output_prep function is called while the graphically represented transformation rules D 65 are set as an argument. Next, from all the input elements x (x∈X) included in the graphically represented transformation rules D 65, all input elements are extracted that do not serve as end points of the input element hierarchy m (links between the input elements, i.e., m∈M), that is, all input elements that do not have a parent input element, to obtain a list X_root of the extracted input elements. The input elements in the X_root are listed in the input sort order. Next, sequentially for each element x1 in the list X_root, the sub function to be described below is called while the element x1, the graphically represented transformation rules D 65, and the transformation rules F 70 in text form are set as arguments. Once this calling has been performed for all the elements x1 in the list X_root, the transformation rules F 70 in text form are completed. Lastly, the completed transformation rules F 70 in text form are returned.

The sub function shown in FIG. 15 is a sub routine of a recursive function. The sub routine is recursively called to sequentially process definitions in the graphically represented transformation rules D 65, so that corresponding rules are added to the transformation rules F 70. In the sub function, firstly, "match a match pattern that is set for x?" is added as a procedure step t in the transformation rules F 70 received as an argument, where x is an input element x received as an argument. Next, the deduce_output function is called while the graphically represented transformation rules D 65 received as an argument and the input element x are set as arguments. A returned value is substituted into the list Y1 of the output elements for the input element x. Next, the following processes are performed for each element y1 in the list Y1 in the order listed.

(1) From the output element hierarchy n (links between the output elements, i.e., n∈N) included in the graphically represented transformation rules D 65, n whose end point is the element y1 is determined to obtain a parent output element y0 of the element y1.

(2) If the parent output element y0 does not exist, that is, if the element y1 does not have a parent, an output element that is set as the element y1 is substituted for a variable q, and "output q as a child element or an attribute name of the root element in the transformation-target structured document" is added as a procedure step for the case in which the procedure t in the transformation rules F 70 results in true.

(3) If the parent output element y0 exists, that is, if the element y1 has its parent, an output element that is set as the element y0 is substituted for a variable p, and an output element that is set as the element y1 is substituted for the variable q. The deduce_input function is called while the graphically represented transformation rules D 65, the input element x, and y1 are set as arguments. A returned value is substituted for the output target x0. As a procedure step for the case in which the procedure t in the transformation rules F 70 results in true, "output q as a child or an attribute name of an element p generated last by x0" is added.

After the above processes are finished for all the elements y1 in the list Y1, then a list X_child of input elements serving as children of the input element x is determined. The elements in the list X_child are listed in the input sort order. For each element x1 in X_child, the sub function is recursively called while the graphically represented transformation rules D 65, the element x1, and the case in which the procedure t in the transformation rules F 70 results in true are set as arguments. Once the sub function has been called for all the elements in X_child, the transformation rules F 70 are completed, and the sub function terminates.

FIG. 16 is a diagram showing transformation rules in text form corresponding to the graphical representation of the transformation rules shown in FIG. 9. The transformation rules shown in FIG. 16 are obtained by processing the graphical representation of the transformation rules according to the pseudo-code shown in FIGS. 10 to 15.

The extraction unit 120 generates, from the document desired to be transformed, the transformation-source structured document having a hierarchical structure resulting from dumping the physical structure of the document desired to be transformed. The extraction unit 120 also extracts elements of the transformation-source structured document. The processing by the extraction unit 120 will be described with reference to pseudo-code shown in FIG. 17. FIG. 17 (*a*) is a conceptual diagram describing pseudo-code of a main function that provides functionality of the extraction unit 120. FIG. 17 (*b*) is a conceptual diagram describing pseudo-code of a sub_spreadsheet function directly called from the main function.

The main function shown in FIG. 17 (*a*) is a function corresponding to the entire processing by the extraction unit 120, and it is a function for generating and outputting, from the document A to be transformed received as an argument, the transformation-source structured document P having a hierarchical structure resulting from dumping the physical structure of the document A. In the main function, firstly, the type of the document A to be transformed is checked. In this embodiment, it is checked whether the type of the document A is a spreadsheet file, a word processor file, a presentation file, or a file that is none of these three types of files and not to be processed. If the type of the document A is any of a spreadsheet file, a word processor file, and a presentation file, a corresponding sub function is called, and a returned value is substituted into the transformation-source structured document P. Lastly, the transformation-source structured document P is returned.

The sub_spreadsheet function shown in FIG. 17 (*b*) is a function called if the document type of the document A to be transformed is a spreadsheet file. In the sub_spreadsheet function, firstly, a new transformation-source structured document p is generated, and a root element e0 is added. For all sheets s included in the document A, a series of processes (1) to (3) below are performed.

(1) A sheet element e1 is output as a child element of the root element e0. The name of the sheet s is output as the value of the "name" attribute of the sheet element e1. Further, a series of processes (2) to (3) below are performed for all rows r included in the sheet s.

(2) A row element e2 is output as a child element of the sheet element e1. The row number of the row r is output as the y attribute value of the row element e2. Further, the process (3) below is performed for all cells c included in the row r.

(3) A cell element e3 is output as a child element of the row element e2. The cell value of the cell c is output as the text value of the cell element e3.

Similarly, a sub function called if the document type of the document A to be transformed is a word processor file or a presentation file can be obtained. Such a sub function can be obtained with known techniques, and therefore details will not be described here. It is to be noted that a corresponding sub function can be similarly obtained for a document type other than the above document types if the physical structure of the document type is known.

The transformation unit 125 takes, as a processing target, each element in the transformation-source structured document extracted by the extraction unit 120, in the depth-first order. The transformation unit 125 applies the transformation rules in text form restored by the restoration unit 115 to the processing target to obtain the transformation-target structured document. The processing by the transformation unit 125 will be described with reference to pseudo-code shown in FIG. 18. FIG. 18 (*a*) is a conceptual diagram describing pseudo-code of a main function that provides functionality of the transformation unit 125. FIG. 18 (*b*) is a conceptual diagram describing pseudo-code of a sub function directly called from the main function.

The main function shown in FIG. 18 (*a*) is a function corresponding to the entire processing by the transformation unit 125, and it is a function for generating and outputting, from the transformation-source structured document P and the transformation rules F received as arguments, the transformation-target structured document Q. In the main function, firstly, a new transformation-target structured document Q is generated, and a root element is added. Next, a root element in the transformation-source structured document P is substituted for a variable p0. Similarly, the root element in the transformation-target structured document Q is substituted for a variable q0. The sub function is called while the variables p0 and q0 and the transformation rules F are set as arguments. The transformation-target structured document Q is completed upon completion of execution of the sub function, so that lastly the transformation-target structured document Q is returned.

The sub function shown in FIG. 18 (*b*) is a sub routine of a recursive function. The sub routine is recursively called to sequentially process each element in the transformation-source structured document, so that each corresponding transformed element is added as an element in the transformation-target structured document. In the sub function, firstly, an element p in the transformation-source structured document P and an element q in the transformation-target structured document Q received as arguments are taken as inputs to the transformation rules F also received as an argument. An output resulting from applying the transformation rules F to the element p is substituted for a transformed element q' in the transformation-target structured document Q. For each of all child elements p1 of the element p in the transformation-source structured document P, the sub function is again called while the child element p1, the transformed element q', and the transformation rules F are set as arguments. Once the recursive calling has been performed for all the child nodes p1, the transformation-target structured document Q is completed, and the sub function terminates.

Figure 19:
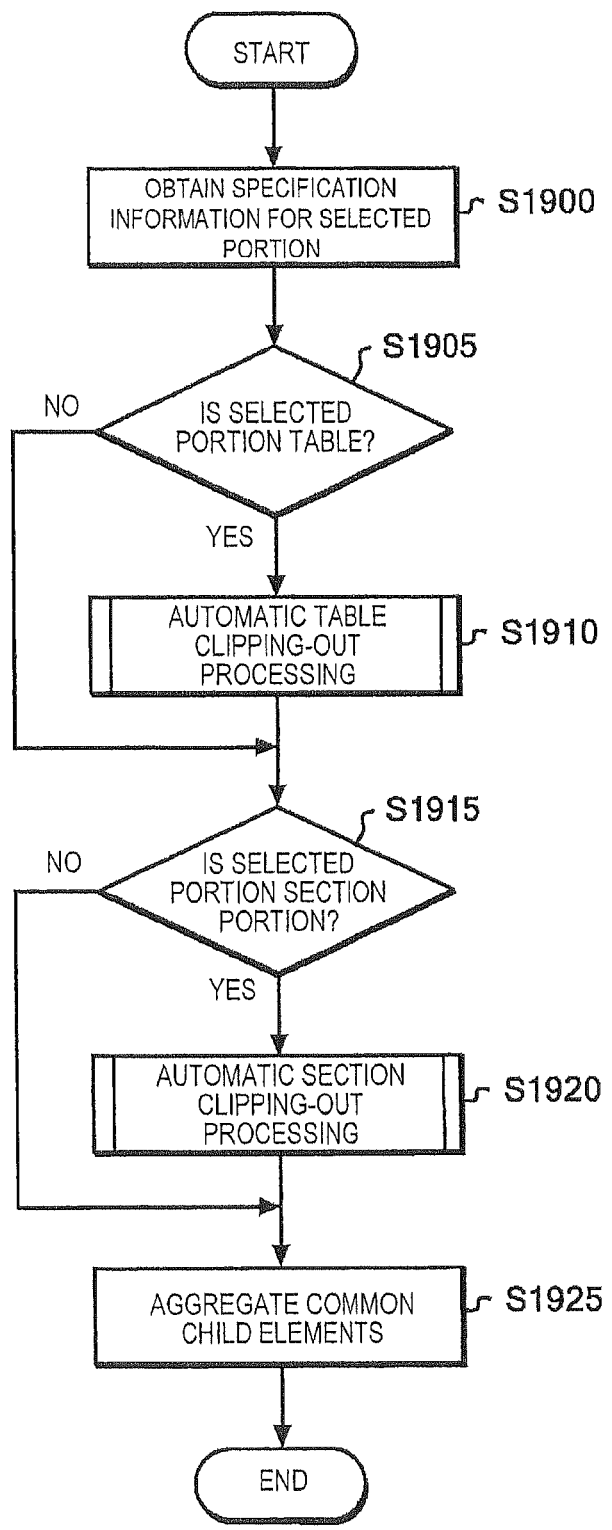
FIG. 19 is a flowchart showing the entire flow of rule complementing processing according to an embodiment of the present disclosure.
Figure 20:
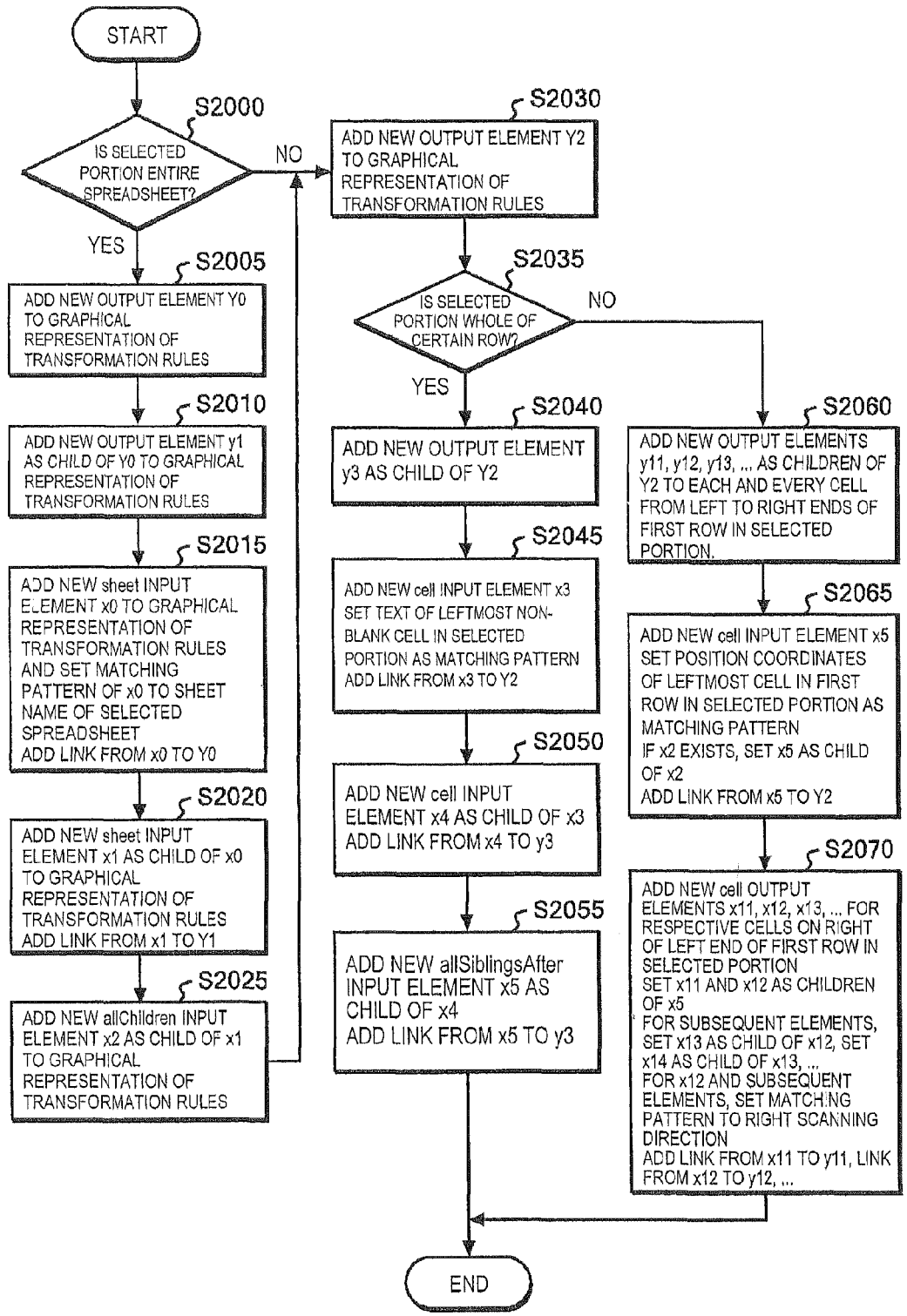
FIG. 20 is a flowchart of automatic clipping-out processing for a table portion in step 1910 in FIG. 19.
Figure 21:
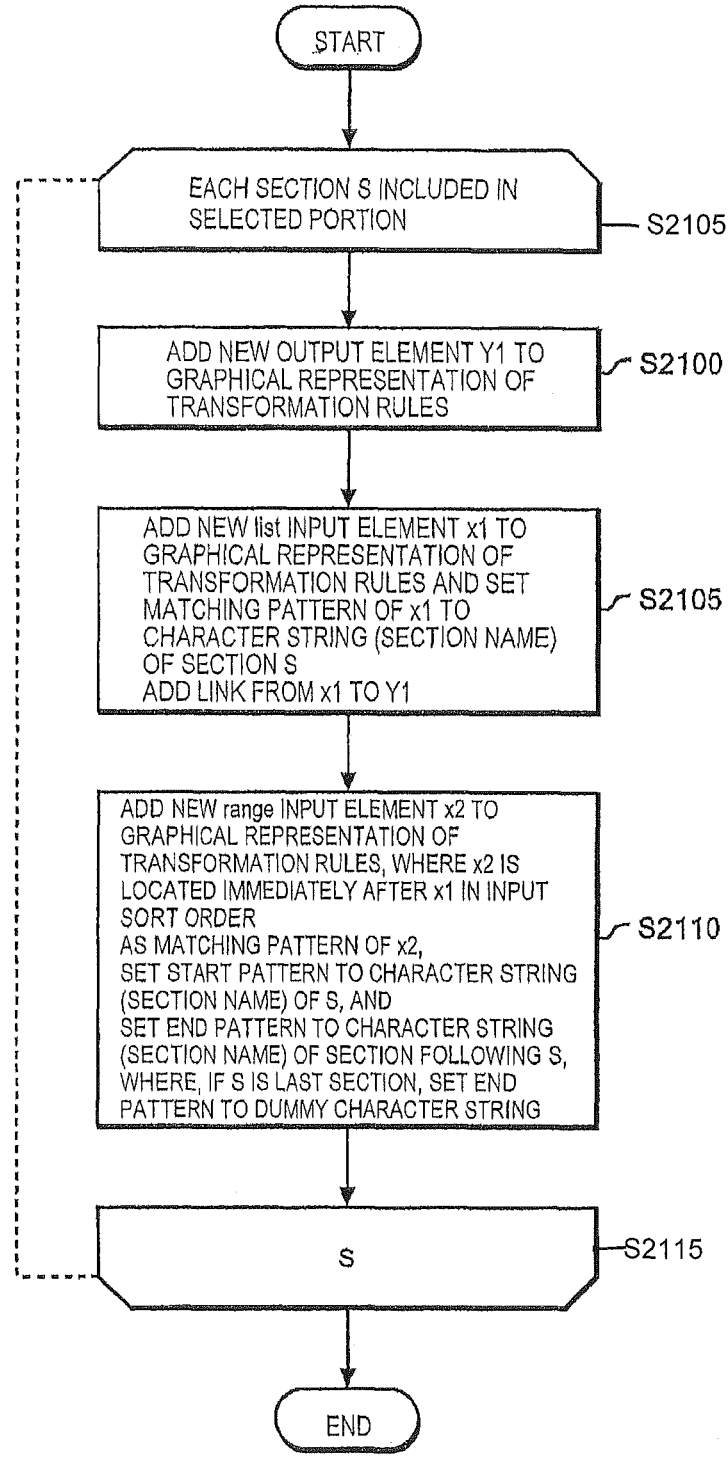
FIG. 21 is a flowchart of automatic clipping-out processing for a section portion in step 1920 in FIG. 19.

Now, with reference to FIGS. 19 to 21, the entire flow of the complementing processing by the rule complementing unit 110 will be described. FIG. 19 is a flowchart showing the entire flow of the complementing processing by the rule complementing unit 110. FIG. 20 is a flowchart of automatic clipping-out processing for a table portion in step 1910 in FIG. 19. FIG. 21 is a flowchart of automatic clipping-out processing for a section portion in step 1920 in FIG. 19.

The complementing processing shown in FIG. 19 starts in step 1900, in which the rule complementing unit 110 obtains specification information specifying a selected portion in response to the user's selection of the portion in the document to be transformed. The rule complementing unit 110 determines whether or not the user-selected portion is a table on the basis of the specification information (step 1905). This determination may be based on the type of the document to be transformed (file type) and the type of physical document elements in the selected portion. Part of cells in a spreadsheet file is also regarded as a table. If it is determined that the selected portion is a table (step 1905: YES), the rule complementing unit 110 performs automatic clipping-out processing for a table portion to be described below with reference to FIG. 20 (step 1910).

If it is determined that the selected portion is not a table (step 1905: NO), or from step 1910, the processing proceeds to step 1915, in which the rule complementing unit 110 determines whether or not the user-selected portion is a section on the basis of the specification information (step 1915). This determination may be based on the type of the document to be transformed (file type) and the type of physical document elements in the selected portion. If it is determined that the selected portion is a section (step 1915: YES), the rule complementing unit 110 performs automatic clipping-out processing for a section to be described below with reference to FIG. 21 (step 1920). If it is determined that the selected portion is not a section (step 1915: NO), or from step 1920, the processing proceeds to step 1925, in which the rule complementing unit 110 searches the generated graphical representation of the transformation rules not including reduced transformation rules. If common child elements are found, the rule complementing unit 110 aggregates these elements under certain conditions and finally outputs the graphical representation D of the transformation rules including reduced transformation rules (step 1925). Thus the processing terminates.

The table clipping-out processing shown in FIG. 20 starts in step 2000, in which the rule complementing unit 110 determines whether or not the selected portion is the entire spreadsheet. If the selected portion is the entire spreadsheet (step 2000: YES), the processing proceeds to step 2005, in which the rule complementing unit 110 adds an output element Y0 to the graphical representation of the transformation rules. The rule complementing unit 110 adds an output element y1 as a child of the output element Y0 to the graphical representation of the transformation rules (step 2010). The rule complementing unit 110 adds a sheet element x0 as an input element to the graphical representation of the transformation rules, and associates, with the sheet element x0, a matching pattern that is set to a sheet name of the selected spreadsheet (step 2015). The rule complementing unit 110 also adds a link that connects the input element x0 to the output element Y0 (step 2015).

The rule complementing unit 110 adds a sheet element x1 as an input element serving as a child of the input element x0 to the graphical representation of the transformation rules, and adds a link that connects the sheet element x1 to the output element y1 (step 2020). The rule complementing unit 110 adds an allChildren node x2 as an input element serving as a child of the sheet element x1 to the graphical representation of the transformation rules (step 2025).

From step 2025, or if the selected portion is not the entire spreadsheet in step 2000 (step 2000: NO), the processing proceeds to step 2030, in which the rule complementing unit 110 adds an output element Y2 to the graphical representation of the transformation rules. The rule complementing unit 110 determines whether or not the selected portion is the whole of a certain row (step 2035). If the selected portion is the whole of a certain row (step 2035: YES), the processing proceeds to step 2040, in which the rule complementing unit 110 adds an output element y3 as a child of the output element Y2.

The rule complementing unit 110 adds a cell element x3 as a new input element, and associates, with the cell element x3, a matching pattern that is set to text of the leftmost non-blank cell (step 2045). The rule complementing unit 110 also adds a link that connects the cell element x3 to the output element Y2 (step 2045). The rule complementing unit 110 adds a cell element x4 as a new input element serving as a child of the cell element x3, and adds a link that connects the cell element x4 to the output element Y3 (step 2050). The rule complementing unit 110 adds an allSiblingsAfter node x5 as an input element serving as a child of the cell element x4, and adds a link that connects the allSiblingsAfter x5 to the output element y3 (step 2055).

If the selected portion is not the whole of a certain row in step 2035 (step 2035: NO), the processing proceeds to step 2060, in which the rule complementing unit 110 adds output elements y11, y12, y13, . . . as children of the output element Y2 to each and every cell from right to left ends of the first row. The rule complementing unit 110 adds a cell element x5 as an input element, and associates, with the cell element x5, a matching pattern that is set to the position coordinates of the leftmost cell in the first row in the selected portion (step 2060). If the input element x2 exists, the cell element x5 is set as a child of the input element x2. The rule complementing unit 110 also adds a link that connects the cell element x5 to the output element Y2 (step 2065).

The rule complementing unit 110 adds cell elements x11, x12, x13, . . . as new input elements for the respective cells on the right of the left end of the first row (step 2070). The cell elements x11 and x12 are set as children of the cell element x5, and the remaining cell elements x13, . . . are each set as a child of a cell element corresponding to the preceding cell. The rule complementing unit 110 associates, with each of the cell element x12 and subsequent elements, a scanning-direction matching pattern that is set to the right (step 2070). The rule complementing unit 110 also adds a link that connects the cell element x11 to the output element y11. Similarly, the rule complementing unit 110 adds links that connect the remaining cell elements x12, x13, . . . to the output elements y12, y13, . . . , respectively (step 2070). After step 2055 or 2070, the processing terminates.

The automatic section clipping-out processing shown in FIG. 21 is repeatedly performed for each section S included in the selected portion selected by the user as shown by the loop between step 2105 and 2115 in FIG. 21. In step 2100, the rule complementing unit 110 adds a new output element Y1 to the graphical representation of the transformation rules. The rule complementing unit 110 adds a list element x1 as an input element to the graphical representation of the transformation rules, and associates, with the list element x1, a matching pattern that is set to a character string (section name) of the section S (step 2105). The rule complementing unit 110 also adds a link that connects the input element x1 to the output element Y1 (step 2105).

The rule complementing unit 110 adds a range node as a new input element to the graphical representation of the transformation rules (step 2110). The range node is located immediately after x1 in the input sort order. The rule complementing unit 110 sets the start-position text pattern to the character string (section name) of the section S, and sets the end-position text pattern to a character string (section name) of a section following the section S (step 2110). If the section S is the last section, the end-position text pattern is set to a dummy character string. When the processes from step 2100 to step 2110 are performed for all the sections S, the processing terminates.

Figure 22:
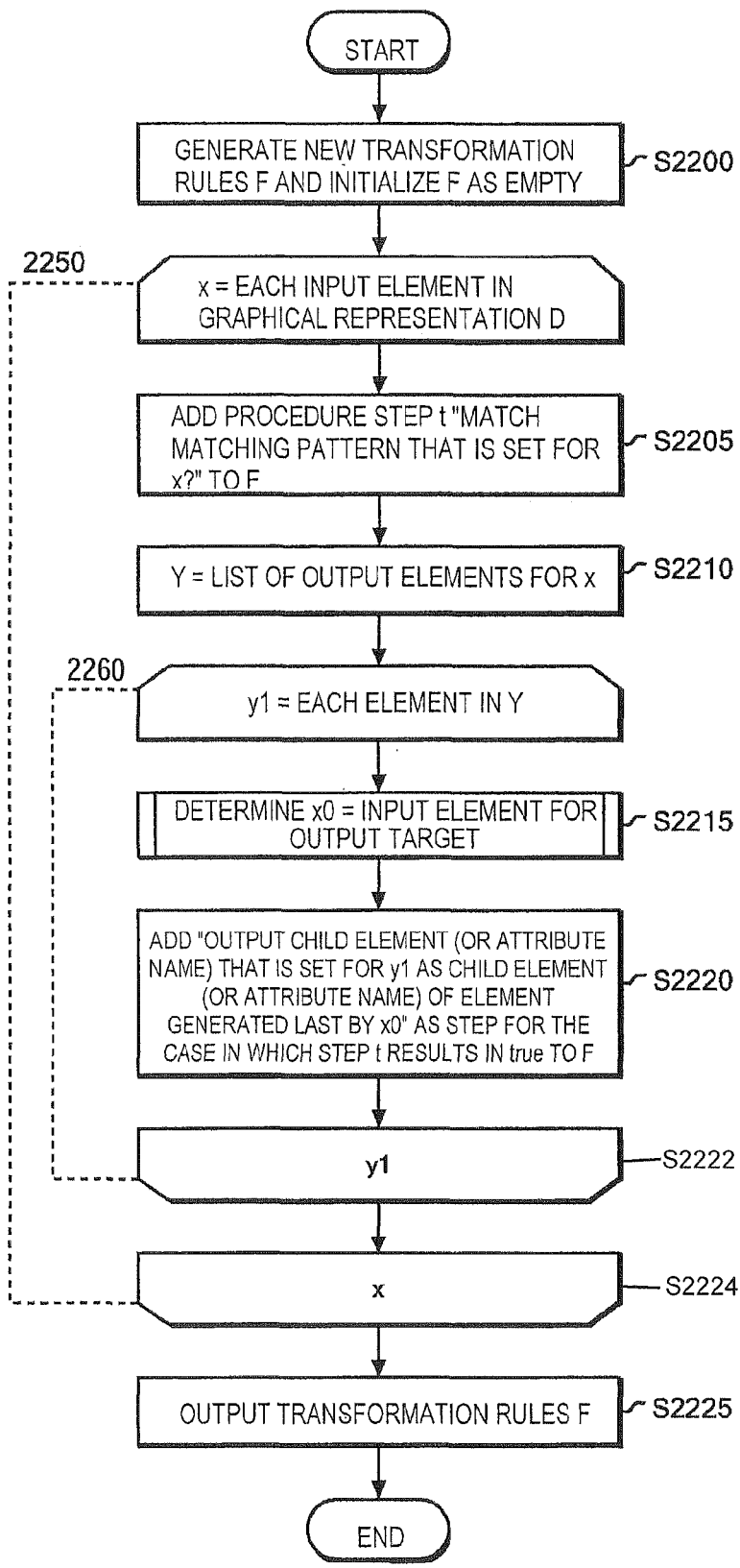
FIG. 22 is a flowchart showing the entire flow of restoration processing according to an embodiment of the present disclosure.
Figure 23:
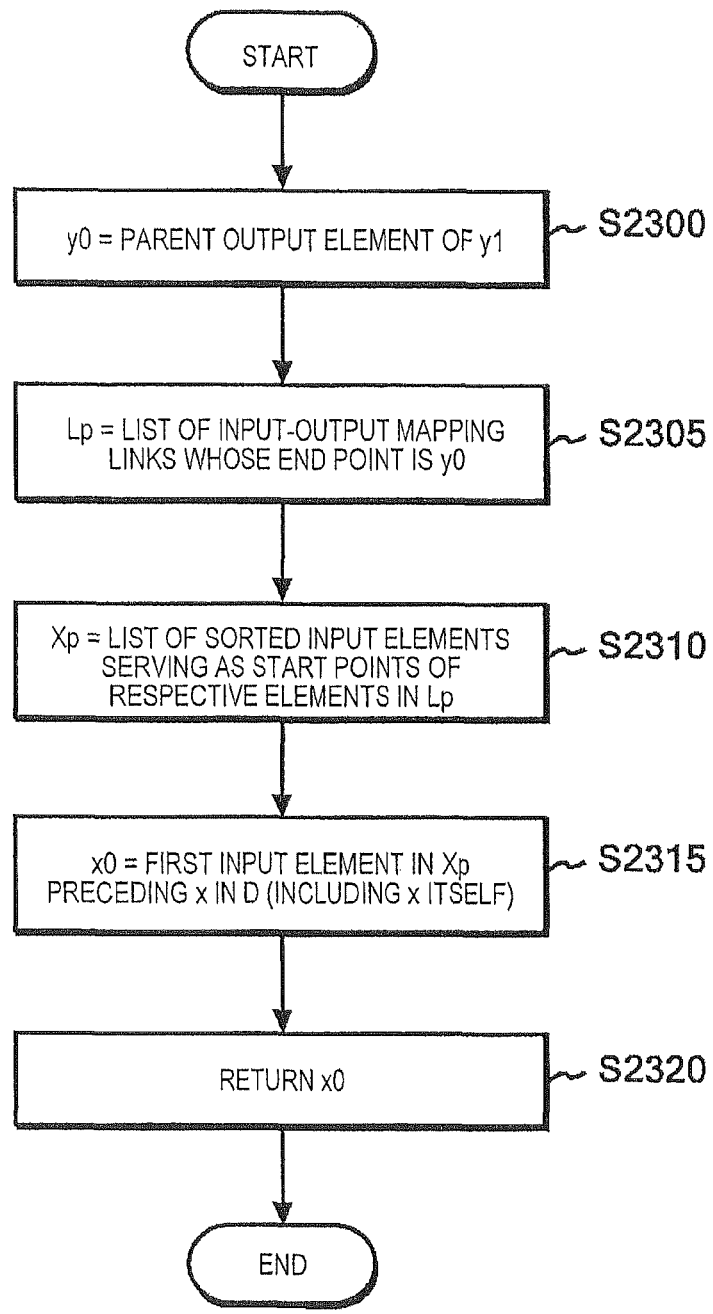
FIG. 23 is a flowchart of processing for determining the closest input element in step 2215 in FIG. 22.

Now, with reference to FIGS. 22 and 23, the entire flow of the restoration processing by the restoration unit 115 will be described. FIG. 22 is a flowchart showing the entire flow of the restoration processing by the restoration unit 115. FIG. 23 is a flowchart of processing for determining the closest input element whose output target is to be referred to for determining an output target in a many-to-one transformation rule in step 2215 in FIG. 22.

The restoration processing shown in FIG. 22 starts in step 2200, in which the restoration unit 115 generates new transformation rules F and initializes the transformation rules F as empty. Through a loop 2250, the restoration unit 115 recursively performs a series of processes from step 2205 to step 2220 for a processing-target, which, as shown at step 2224 is repeated for a node x of each input element included in the graphical representation D of the transformation rules, in the input sort order. In step 2205, the restoration unit 115 adds a procedure t "match a matching pattern that is set for x?" to the transformation rules F. The restoration unit 115 determines a list of output elements for the node x listed in the output sort order, and sets the list as Y (step 2210).

Through a loop 2260, the restoration unit 115 repeatedly performs a series of processes from step 2215 to step 2220 for a processing-target, which, as shown at step 2222, is repeated for each element y1 in the list Y, in the order listed. In step 2215, on the basis of the processing-target element y1, the restoration unit 115 determines an input element whose output target is to be referred to and sets the input element as x0. Details of the processing in step 2215 will be described below with reference to FIG. 23. The restoration unit 115 adds "output a child element (or attribute name) that is set for y1 as a child element (or attribute name) of an element generated last by x0" as a step for the case in which t results in true to the transformation rules F. When the loop 2260 is finished for the node x of the last input element included in the graphical representation D in the input sort order, the processing proceeds to step 2225, in which the restoration unit 115 outputs the transformation rules F in text form. Thus the processing terminates. The output transformation rules F are stored in a storage device (not shown).

The processing for determining the input element shown in FIG. 23 starts in step 2300, in which the restoration unit 115 determines an output target that is the parent of the current processing-target element y1 of an output element, and sets the output target as y0. The restoration unit 115 determines a list of all links from input elements to the output element y0 serving as the end point, and sets the list as Lp (step 2305). The restoration unit 115 determines a list in which the input elements serving as the start points of the respective links listed in Lp are listed in the input sort order, and sets the list as Xp (step 2310). The restoration unit 115 determines the first input element among input elements in the list Xp located before the current processing-target x of an input element, including the processing-target x, and sets the first input element as x0 (step 2315). Lastly, the restoration unit 115 returns x0 as the input element whose output target is to be referred to (step 2320). Thus the process terminates.

Figure 24:
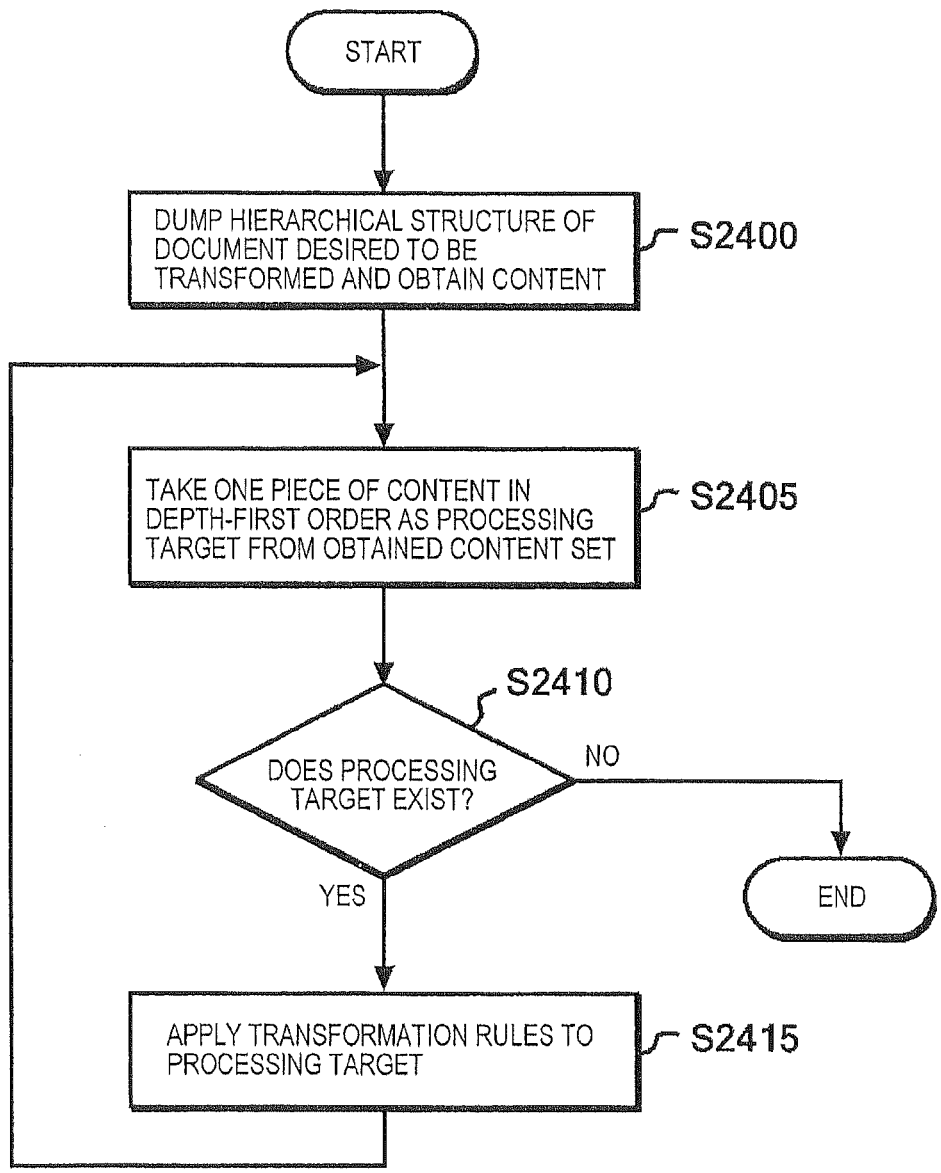
FIG. 24 is a flowchart showing the entire flow of extraction and transformation processing according to an embodiment of the present disclosure.

Now, with reference to FIG. 24, the entire flow of the transformation by the extraction unit 120 and the transformation unit 125 will be described. The processing shown in FIG. 24 starts in step 2400, in which the extraction unit 120 dumps the physical structure of the document desired to be transformed and obtains the transformation-source structured document having that physical structure, and obtains elements in the document. The transformation unit 125 takes one element from the transformation-source structured document in the depth-first order (step 2405). The transformation unit 125 determines whether or not a processing-target element exists, i.e., whether or not the one element is successfully obtained (step 2410). If the one element is successfully obtained (step 2410: YES), the transformation rules F are read from the storage device and applied to the processing-target element (step 2415). The processing then returns to step 2405. If the processing-target element does not exist in step 2410, the processing terminates.

Figure 25:
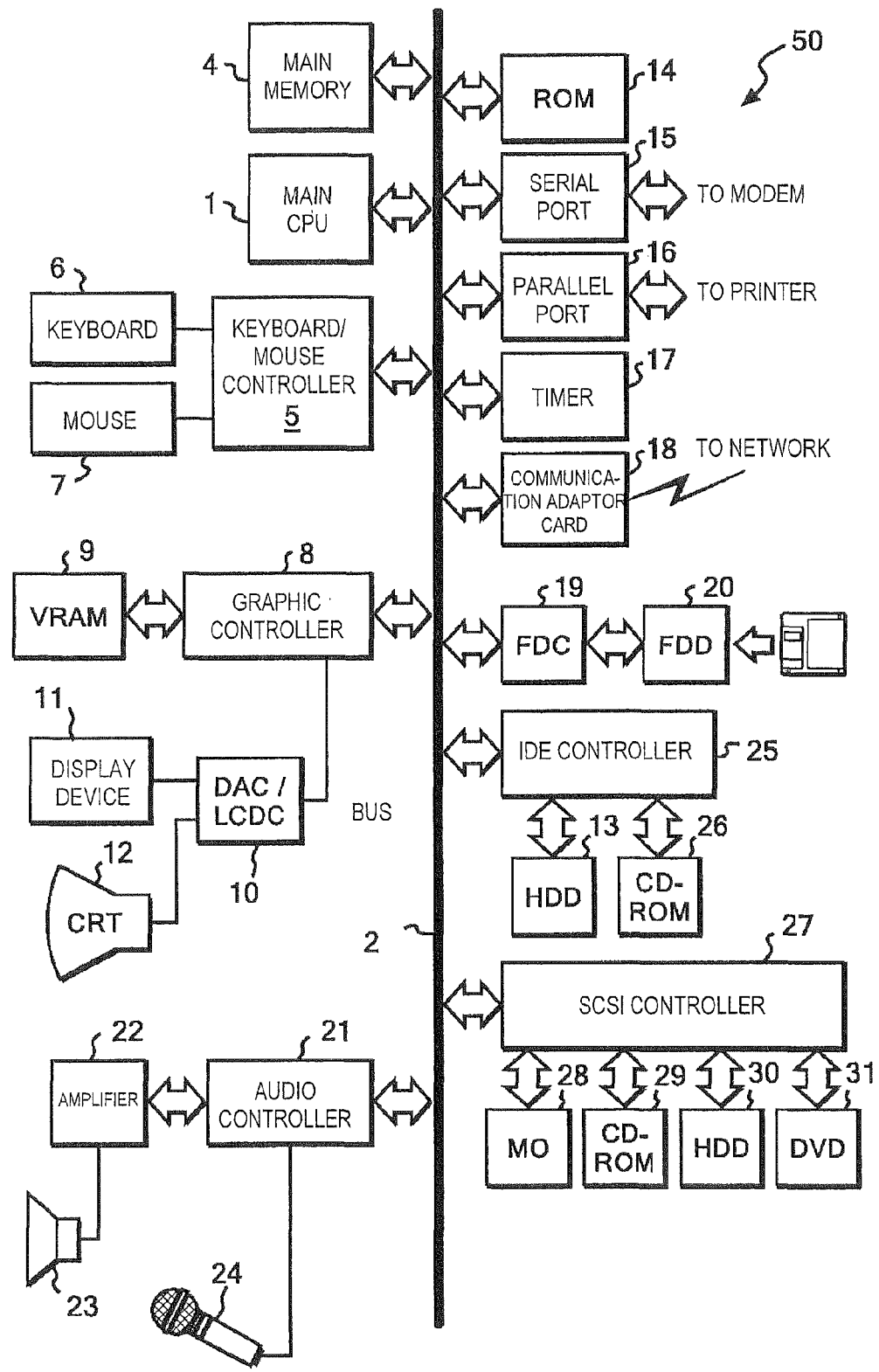
FIG. 25 is a diagram showing an exemplary hardware configuration of an information processing apparatus suitable for implementing the transformation rule generation supporting apparatus according to an embodiment of the disclosure herein.

FIG. 25 is a diagram showing an exemplary hardware configuration of a computer 50 as the transformation rule generation supporting apparatus 100 according to an embodiment of the present disclosure. The computer 50 includes a main CPU (Central Processing Unit) 1 and a main memory 4, which are connected to a bus 2. The computer also includes a serial port 15, parallel port 16, and timer 17 which are connected to the bus 2. Hard disk devices 13 and 30, and removable storage (external storage systems capable of replacement of recording media) such as CD-ROM devices 26 and 29, a flexible disk device 20, an MO device 28, and a DVD device 31 are connected to the bus 2 via controllers such as a flexible disk controller 19, an IDE controller 25, and a SCSI controller 27.

Storage media such as a flexible disk, an MO, a CD-ROM, and a DVD-ROM are inserted into the removable storage. These storage media, the hard disk devices 13 and 30, and the ROM 14 can record computer program code for providing instructions to the CPU 1 in cooperation with an operating system and thereby implementing the present disclosure. That is, the various storage devices described above can record a transformation rule generation supporting program that is installed in the computer 50 to cause the computer 50 to function as the transformation rule generation supporting apparatus 100 according to embodiments of the present disclosure, as well as data such as the document desired to be transformed, the transformation-source structured document, the transformation-target structured document, and the generated graphical representation of transformation rules with and without reduction.

The program for supporting generation of transformation rules includes a user interface module, a rule complementing module, a restoration module, an extraction module, and a transformation module. These modules operate on the CPU 1 to cause the computer 50 to function as the user interface 105, the rule complementing unit 110, the restoration unit 115, the extraction unit 120, and the transformation unit 125. The computer program may be compressed, or divided into a plurality of portions and recorded on a plurality of media.

The computer 50 receives inputs from input devices such as a keyboard 6 and a mouse 7 via a keyboard/mouse controller 5. The computer 50 also receives inputs from a microphone 24 and outputs audio from a speaker 23 via an amplifier 22 and an audio controller 21. The computer 50 is connected, via a graphics controller 8 (which is connected to a VRAM 9) and a DAC/liquid crystal display controller (LCDC) 10, to a display device 11 and a CRT 12 for presenting visual data to a user. The computer 50 can connect to a network, e.g., via a communication adapter card 18 (an Ethernet® card or a token-ring card), to communicate with other computers etc.

From the above description, it will be readily understood that the computer 50 may be implemented by an information processing apparatus such as a general personal computer, a workstation, or a mainframe, or a combination thereof. The above-described components are illustrative, and not all the components are essential for the present disclosure.

While the present disclosure has been described above with reference to the embodiments, the technical scope of the present disclosure is not limited to what has been described in the above embodiments. It is apparent to those skilled in the art that various modifications or improvements may be made to the above embodiments. Accordingly, embodiments with such modifications or improvements should be included in the technical scope of the present disclosure.

It is to be noted that processing such as operations, procedures, steps, and stages in devices, systems, programs, and methods described in the claims, specification, and drawings may be performed in any order unless specified as "before," "preceding," etc., or unless an output in preceding processing is used in subsequent processing. It is also to be noted that, even if an output in preceding processing is used in subsequent processing, other processing may be able to interpose between the preceding processing and the subsequent processing, or, even if other processing is described to interpose between preceding processing and subsequent processing, the order may be able to be modified so that the preceding processing is performed immediately before the subsequent processing. Any statements such as "firstly," "next," and "then" used for convenience of description with respect to operational flows in the claims, specification, and drawings do not necessarily mean that the operational flows should be carried out in the described orders.

The invention claimed is:

1. A transformation rule generation supporting method performed by a computer system for supporting generation of a transformation rule for transforming a transformation-source structured document having a hierarchical structure based on physical disposition of data in the document into a transformation-target structured document having a hierarchical structure based on a logical structure of data content, the method comprising:

the computer system reading a graphical representation of the transformation rule from a storage device, the graphical representation of the transformation rule including at least one of: a plurality of links indicating a reduced transformation rule of a one-to-many transformation rule and mapping one node representing an input element that is an element in the transformation-source structured document to a plurality of nodes each representing an output element that is an element in the transformation-target structured document; and a plurality of links indicating a reduced transformation rule of a many-to-one transformation rule and mapping a plurality of nodes each representing an input element in the transformation-source structured document to one node representing an output element in the transformation-target structured document; and in response to that the read graphical representation of the transformation rule is the one-to-many transformation rule, the computer system determining, according to an output sort order, an output order in which each of the output elements represented by the plurality of nodes is output for the input element represented by the one node, the output sort order being a depth-first order in the hierarchical structure of the transformation-target structured document, and in response to that the read graphical representation of the transformation rule is the many-to-one transformation rule, the computer system determining an output target to which the output element represented by the one node is output for each of the input elements represented by the plurality of nodes with reference to an output target of an input element located immediately before each of the input elements in a list in an input sort order of one or more input elements mapped to an output element that is a parent of the output element, the input sort order being a depth-first order in the hierarchical structure of the transformation-source structured document.

2. The transformation rule generation supporting method according to claim 1, wherein:

the graphical representation of the transformation rule includes a set of nodes representing input elements, a set of links each representing a hierarchical relationship between two different nodes in the set of the nodes representing the input elements, the set of nodes representing output elements, a set of links each representing a hierarchical relationship between two different nodes in the set of the nodes representing the output elements, and a set of links representing correspondence between the nodes representing the input elements and the nodes representing the output elements;

each node and each link have associated therewith at least one of a pattern for use in matching performed for each element in a structured document to be transformed and an output-related parameter; and a restoration unit generates a transformation rule in text form for a processing-target node taken from the set of the nodes representing the input elements in the input sort order, the transformation rule instructing, on condition that matching using the pattern associated with the processing-target node succeeds for an element in the structured document to be transformed, to output an output element represented by a node mapped by a link to the processing-target node, on the basis of the output-related parameter associated with the link and the output-related parameter associated with the node representing the output element.

3. The transformation rule generation supporting method according to claim 2, wherein the graphical representation of the transformation rule includes, as a specification node, a node representing an input element and specifying a range in the structured document to be transformed in which application of transformation processes each indicated by a link mapping an input element and an output element is attempted.

4. The transformation rule generation supporting method according to claim 3, wherein the specification node specifies a range in which application of a series of transformation processes indicated by links starting at all child nodes of the specification node is attempted, the range being specified as all children of an element in the structured document to be transformed that matches a pattern associated with a parent node of the specification node.

5. The transformation rule generation supporting method according to claim 3, wherein the specification node specifies a range in which application of a transformation process indicated by a link to be processed last among links starting at a parent node of the specification node is attempted, the range being specified as all siblings located after an element in the structured document to be transformed that matches a pattern associated with the parent node of the specification node.

6. The transformation rule generation supporting method according to claim 3, wherein the specification node specifies a range in which application of transformation processes indicated by links starting at all child nodes of the specification node is attempted, the range being specified as a range from an element in the structured document to be transformed that matches an application-range start-position matching pattern associated with the specification node, to an element in the structured document to be transformed that matches an application-range end-position matching pattern associated with the specification node.

7. The transformation rule generation supporting method according to claim 6, further comprising generating, with a rule complementing unit, the graphical representation of the transformation rule for a selected portion in response to a user selection of a portion in the transformation-source structured document;

wherein on condition that the selected portion is a plurality of section rows, the rule complementing unit generates: a node representing a parent output element for each section row in the selected portion, the node having associated therewith an element name corresponding to the section row; a node representing a parent input element for each section row in the selected portion, the node having associated therewith a list-element text matching pattern that is set to a character string of the section row; a link mapping each node representing the parent output element to each corresponding node representing the parent input element; and the specification node immediately after each node representing the parent input element, and the specification node has associated therewith the application-range start-position matching pattern that is set to the character string of each section row, and the application-range end-position matching pattern that is set to a character string of a next section row.

8. The transformation rule generation supporting method according to claim 2, wherein a list of the set of the nodes representing the input elements listed in the input sort order is generated so that (1) on condition that a link exists from a node xS representing an input element to a node xE representing an input element, the node xS precedes the node xE, and (2) on condition that links exist from a node xS representing an input element to a plurality of nodes xEi (i is a positive integer starting from 1) representing input nodes, the order of the plurality of nodes xEi is determined using coordinates at an upper-left corner of each node xEi as sort keys.

9. The transformation rule generation supporting method according to claim 2, wherein a list of the set of the nodes representing the output elements listed in the output sort order is generated so that (1) on condition that a link exists from a node yS representing an output element to a node yE representing an output element, the node yS precedes the node yE, and (2) on condition that links exist from a node yS representing an output element to a plurality of nodes yEi (i is a positive integer starting from 1) representing output elements, the order of the plurality of nodes yEi is determined using coordinates at an upper-left corner of each node yEi as sort keys.

10. The transformation rule generation supporting method according to claim 2, further comprising generating, with a rule complementing unit, the graphical representation of the transformation rule for a selected portion in response to a user selection of a portion in the transformation-source structured document;

wherein on condition that the selected portion is part or all of a table, the rule complementing unit generates: a node representing a parent output element for a first row in the selected portion, the node having associated therewith an element name corresponding to the first row, and a node representing an output element for each cell on the right of a leftmost cell in the first row as a child of the parent output element node, the child node having associated therewith an element name corresponding to the cell, sequentially from the left; a node representing a parent input element for the leftmost cell in the first row in the selected portion, the node having associated therewith a position-coordinate matching pattern that is set to position coordinates of the leftmost cell, and a link mapping the node to the node representing the parent output element; a node representing an input element for each cell on the right of the leftmost cell in the first row in the selected portion, the node having associated therewith a scanning-direction matching pattern that is set to right, the node being generated as a child of the parent input element node for each of first two cells, and being generated as a child of an input element node corresponding to an immediately preceding cell for each of remaining cells, sequentially from the left; and a link mapping each node representing the child input element to the node representing the child output element having a corresponding attribute name associated therewith.

11. The transformation rule generation supporting method according to claim 2, further comprising generating, with a rule complementing unit, the graphical representation of the transformation rule, wherein the rule complementing unit scans the set of the nodes of the output elements in the output sort order and, in response to detecting two nodes having the same element name or attribute name associated therewith, determines whether or not links exist from a plurality of nodes representing input elements mapped to one node of the two nodes and all child nodes of the one node, respectively, to another node of the two nodes and all child nodes of the other node, and whether or not links exist from a plurality of nodes representing input elements mapped to the other node and all the child nodes of the other node, respectively, to the one node and all the child nodes of the one node, and integrates the two nodes on condition that it is determined that neither of the links exist.

12. The transformation rule generation supporting method according to claim 2, further comprising:
- extracting, with an extraction unit, elements from a structured document having a hierarchical structure resulting from dumping a physical structure of a document desired to be transformed; and
- obtaining, with a transformation unit, the transformation-target structured document by taking each element in the hierarchical structure as a processing target in the depth-first order and by applying the transformation rule in text form restored by the restoration unit to the processing target.

\* \* \* \* \*